United States Patent
Kannan et al.

(10) Patent No.: US 12,086,153 B1
(45) Date of Patent: Sep. 10, 2024

(54) AUTOMATIC EXPECTED VALIDATION DEFINITION GENERATION FOR DATA CORRECTNESS IN AI/ML PIPELINES

(71) Applicant: HEWLETT PACKARD ENTERPRISE DEVELOPMENT LP, Spring, TX (US)

(72) Inventors: Kalapriya Kannan, Karnataka (IN); Chirag Talreja, Karnataka (IN); Chinmay Chaturvedi, Karnataka (IN); Sagar Venkappa Nyamagouda, Karnataka (IN); Jayasankar Nallasamy, Karnataka (IN); Prasad Pimplaskar, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/308,093

(22) Filed: Apr. 27, 2023

(51) Int. Cl.
*G06F 16/25* (2019.01)
*G06F 16/21* (2019.01)

(52) U.S. Cl.
CPC .......... *G06F 16/254* (2019.01); *G06F 16/213* (2019.01)

(58) Field of Classification Search
CPC ............................ G06F 16/254; G06F 16/213
See application file for complete search history.

(56) References Cited

U.S. PATENT DOCUMENTS

| | | | |
|---|---|---|---|
| 9,582,541 B2 | 2/2017 | Sareen et al. | |
| 9,824,108 B2 | 11/2017 | Taylor et al. | |
| 10,467,039 B2 | 11/2019 | Bailey et al. | |
| 2019/0073388 A1 | 3/2019 | Desmarets | |
| 2020/0380417 A1* | 12/2020 | Briancon | G06Q 10/06393 |
| 2021/0200747 A1 | 7/2021 | Aleksandrovich et al. | |
| 2021/0232603 A1 | 7/2021 | Sundaram et al. | |
| 2021/0232604 A1 | 7/2021 | Sundaram et al. | |
| 2021/0303585 A1* | 9/2021 | Fan | G06F 16/27 |
| 2022/0114483 A1 | 4/2022 | Sabharwal et al. | |

(Continued)

OTHER PUBLICATIONS

"Apache Avro™—a data serialization system", available online at <https://avro.apache.org/>, 2022, 59 pages.

(Continued)

*Primary Examiner* — Merilyn P Nguyen
(74) *Attorney, Agent, or Firm* — Sheppard Mullin Richter & Hampton LLP

(57) ABSTRACT

Systems and methods are provided for generating extract-transform-load ("ETL") machine learning ("ML") pipeline validation rules based on user-input, wherein the ETL ML pipeline validation rules may be applicable to validate an ETL ML pipeline against multiple test datasets. The ETL ML pipeline validation rules may comprise compute-type validation rules for computing expected values of data structures within a dataset output by the ETL ML pipeline. The ETL ML pipeline validation rules may comprise check-type validation rules for checking whether data structures within a dataset output by the ETL ML pipeline have intended characteristics. Where the ETL ML pipeline validation rules are applicable to validate an ETL ML pipeline against a test dataset which was not referenced to describe the ETL ML pipeline validation rules, then the ETL ML pipeline may reuse these ETL ML pipeline validation rules to validate the ETL ML pipeline without further user-input.

20 Claims, 13 Drawing Sheets

(56) References Cited

U.S. PATENT DOCUMENTS

2022/0237101 A1    7/2022  Singh et al.
2022/0237102 A1    7/2022  Bugdayci et al.
2024/0037077 A1*  2/2024  Verma .................... G06F 16/211

OTHER PUBLICATIONS

Accenture Consulting, "Model Behavior Nothing Artificial", 2017, 20 pages.
C3.ai., "Model Validation", available online at <https://c3.ai/glossary/data-science/model-validation/>, 2023, 4 pages.
Deepchecks, "AI Model Validation", available online at <https://deepchecks.com/glossary/ai-model-validation/>, 2023, 7 pages.
Google, "Overview of ML Pipelines", available online at <https://developers.google.com/machine-learning/testing-debugging/pipeline/overview>, 2022, 2 pages.
IBM, "What is data modeling?", available online at <https://web.archive.org/web/20230224113943/https://www.ibm.com/topics/data-modeling>, Feb. 24, 2023, 9 pages.
Oreilly, "Chapter 4. Data Validation", available online at <https://www.oreilly.com/library/view/building-machine-learning/9781492053187/ch04.html>, 2023, 27 pages.

* cited by examiner

AUTOMATIC EXPECTED VALIDATION DEFINITION GENERATION FOR DATA CORRECTNESS IN AI/ML PIPELINES

CROSS-REFERENCE TO RELATED APPLICATIONS

The present application is related to co-pending and co-owned U.S. patent application Ser. No. 18/308,050, filed on Apr. 27, 2023, titled "DATA CORRECTNESS AND VALIDATION USING VALIDATION DEFINITION LANGUAGE", which is hereby incorporated herein by reference in its entirety.

BACKGROUND

In an extract-transform-load ("ETL") process, data items (e.g. data structures, data structure features, data values) are extracted from an input data structure, optionally transformed or altered in some way, and then loaded into an output data structure. For instance, a business may apply an ETL process to a data structure representing an annual income statement with the goal of updating a data structure representing the business's balance sheet. The ETL process extracts the profits and losses for that year, transforms the profits and losses into changes in assets, liabilities, and equity, and loads the changes in assets, liabilities, and equity into the balance sheet data structure. The words "extract" and "load" are not necessarily to be taken literally; the extraction and/or load phases may be preceded by the creation of copies of the input and/or output data structures, such that the original input and/or output data structures are preserved and only copies are manipulated by the ETL processes.

An ETL process may depend on some conformity among input data structures, at least as to data items referenced by the instructions comprising the ETL process. As such, ETL processes may be applicable only to a narrow range of input data structures, i.e. those input data structures that happen to comprise data items referenced by the ETL process. In order to facilitate the transformation of broader ranges of input data structures, ETL-based machine learning ("ML") algorithms have been developed.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
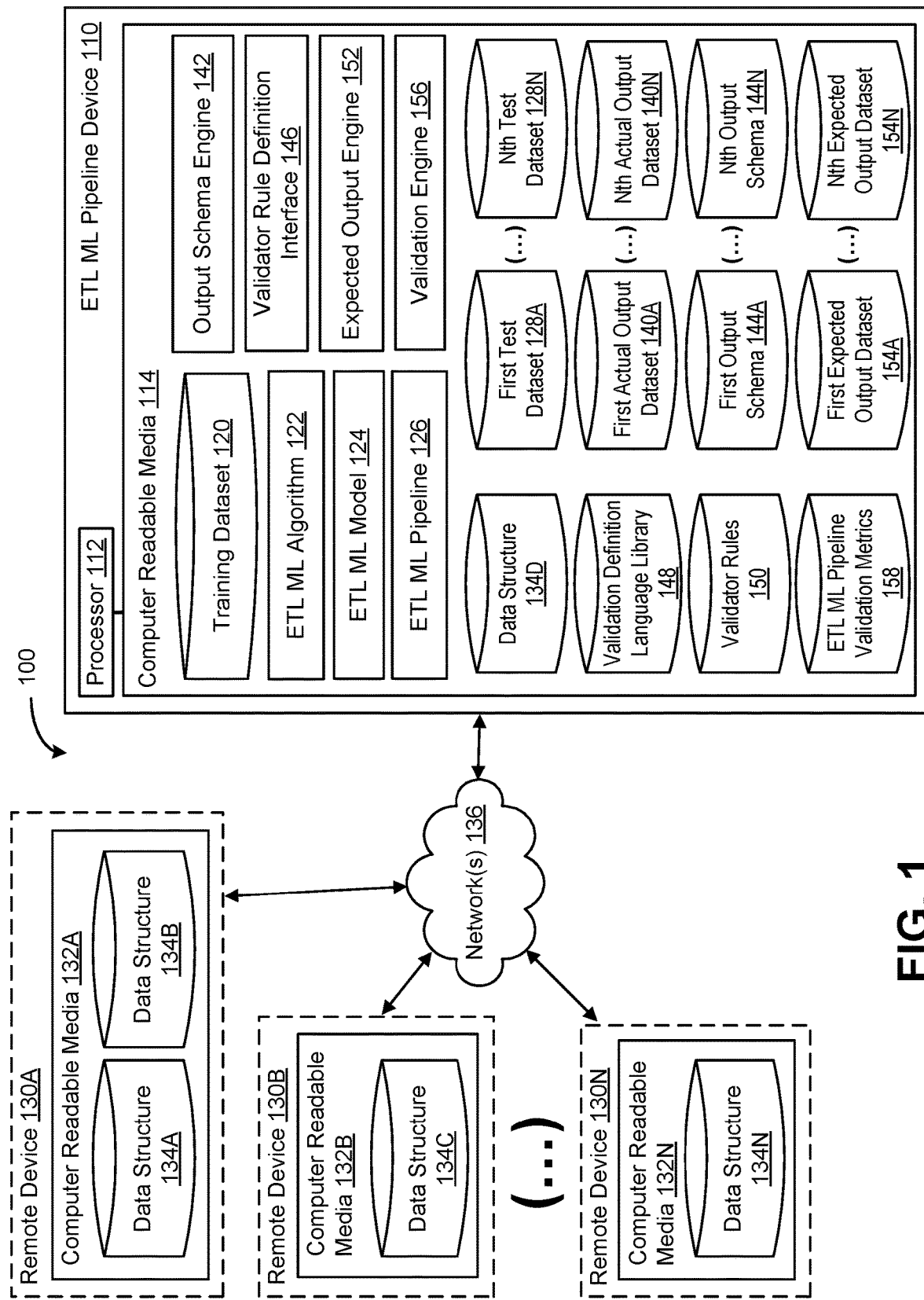
FIG. 1 illustrates an example ETL ML pipeline validation system, in accordance with examples disclosed herein.

The figures are not exhaustive and do not limit the present disclosure to the precise form disclosed.

DETAILED DESCRIPTION

ETL-based ML algorithms ("ETL ML algorithms") may be trained on a training dataset comprising a training input portion and a training output portion. The "training input portion" refers to one or more data structures sampled from an input dataspace. The training input portion may be built by any method for sampling from one or more data structures (e.g., random, systematic, clustered).

As used herein, an "input dataspace" refers to one or more data structures intended to be transformed into, or to form the basis for generation of, one or more output data structures. The one or more output data structures may be referred to herein as the "output dataspace." The intentions referenced by the "intended" transformation of the input dataspace refer to the intentions of a dataspace manager.

The "training output portion" of the training dataset comprises one or more data structures representing what would be generated if the intended transformations for the input dataspace were applied to the training input portion. A training output portion may be built by a dataspace manager conceptualizing the intended transformations as an ETL process, writing instructions for the ETL process with reference to data items within the training input portion, and then applying the ETL process to the training input portion. The training dataset may be built by the dataspace manager individually populating values within the training output portion after reviewing the training input portion. In any case, a training dataset comprising a training input portion and a training output portion may manifest ETL processes based on intended transformations underlying the construction of the training output portion.

When trained on training datasets manifesting ETL processes, ETL ML algorithms may draw relations between data items within the training input portion and data items within the training output portion. These relations may reflect extrapolated ETL processes based on patterns within the manifested ETL processes. The ETL ML algorithm may generate an ETL ML model comprising these drawn relations and the extrapolated ETL processes they reflect.

An ETL ML model may be implemented within an ML pipeline to form an ETL ML pipeline. A test dataset comprising one or more data structures from the input dataspace may then be fed into the ETL ML pipeline to generate an actual output dataset. The "actual output dataset" may comprise one or more data structures resulting from applying the extrapolated ETL processes to the test dataset. When compared with a manifested ETL process, the ETL ML pipeline may handle a broader range of input data structures, i.e., one with more variance in data items. This is because the ETL ML pipeline incorporates the ETL ML model which may reflect the broader extrapolated ETL processes.

Assuming one or more test datasets covers each data structure within the input dataspace at least once, a transformation of an input dataspace into an output dataspace may be completed by feeding all of these test datasets into a valid ETL ML pipeline. This may be done sequentially over multiple iterations of the valid ETL ML pipeline, or in parallel across multiple parallel copies of the valid ETL ML pipeline. The actual output datasets generated by this process may be combined together to build the output dataspace.

An ETL ML pipeline may be said to be "valid" regarding a test dataset when the actual output dataset generated by feeding the test dataset into the ETL ML pipeline sufficiently matches an expected output dataset. An "expected output dataset" may be one or more data structures which would have been created by applying the manifested ETL processes to a cleaned up version of the test dataset. A "cleaned up" version of the test dataset is a version of the test dataset modified to bring the data items of the test dataset into conformity with the data items referenced by the manifested ETL processes.

Validation of ETL ML pipelines against multiple test datasets may require repeated and labor-intensive efforts. A manifested ETL process may have only been evident from the way the training dataset was constructed, rather than expressed as a stand-alone set of instructions. In these scenarios, the manifested ETL process must be conceptualized and written down as stand-alone instructions before the manifested ETL process may be applied to a test dataset. Further, a test dataset may need to be cleaned up in some way (e.g., a dataspace manager may need to manipulate the varying data items to bring the test dataset into conformity with data items referenced by the manifested ETL) before the manifested ETL processes can be applied to the test dataset. After such efforts, the manifested ETL process may be applied to the test dataset in order to generate the expected output dataset, which may then be compared to the actual output dataset. Alternatively, a dataspace manager may build an expected output dataset by individually populating values within the expected output dataset after reviewing the test dataset.

The conceptualization and writing down of manifested ETL processes, the cleaning up of a test dataset, and the individual population of values within the expected output dataset all may require direct human attention and interaction. Therefore, validation of ETL ML pipelines may require labor-intensive efforts on the part of humans. In addition, this validation determination may pertain to only a single test dataset. The labor-intensive nature of these efforts may become troublesome as the number of test datasets comprising the input dataspace increases, because the efforts may need to be repeated for each test dataset to validate the ETL ML pipeline against the entire input dataspace.

Proceeding with a ETL ML pipeline based transformation of an input dataspace which is validated against less than all the test datasets comprising the input dataspace runs the risk of spending time and energy processing test datasets via an invalid ETL ML pipeline. Where a test dataset is processed by an invalid ETL ML pipeline, the generated actual output dataset may not combine with other actual output datasets generated by the ETL ML pipeline to form an output dataspace reflecting the intended transformation of the input dataspace. Where an output dataspace doesn't reflect the intended transformation of the input dataspace, all time and energy spent in processing the test datasets is wasted. Therefore, incentives arise for systems and methods for ETL ML pipeline validation which may validate an ETL ML pipeline against multiple test datasets while minimizing labor intensive user interactions.

As such, the systems and methods described herein may serve to reduce the requirement for labor-intensive efforts when validating an ETL ML pipeline against multiple test datasets.

One method for reducing the requirement for labor-intensive efforts when validating an ETL ML pipeline against multiple test datasets involves training the ETL ML algorithm with a second training dataset sampled from the input dataspace. This will generate a second ETL ML model which can be implemented in a parallel second ETL ML pipeline. Test datasets can then be fed into both the first ETL ML pipeline and the second ETL ML pipeline, generating two separate actual output datasets. One of the actual output datasets can then be treated as an expected output dataset and compared with the other actual output dataset to make a validity determination. This validity determination applies only to the test dataset that was fed in parallel to both ETL ML pipelines, but the validity determination can be easily repeated for all test datasets because both actual output dataset is generated without user interaction. However, one flaw with this method is that neither of the ETL ML pipelines have been independently validated. The first ETL ML pipeline is thus only known to be as valid as the second ETL ML pipeline. Both the first ETL ML pipeline and second ETL ML pipeline could still suffer from undetected shared defects which render both ETL ML pipelines invalid. Shared defects may arising out of, e.g., any flaws in a shared underlying ETL ML algorithm or patterns in the training dataset sampling process. As such, the systems and methods disclosed herein may reduce the requirement for labor-intensive efforts when validating ETL ML pipelines against multiple test datasets without relying on a second, non-independently validated, ML model or pipeline.

The disclosed systems and methods of ETL ML pipeline validation may implement, among other components, an output schema engine, a validator rule definition interface, an expected output engine, and a validation engine.

The output schema engine may generate an output schema based on an actual output dataset. The actual output dataset may be generated after feeding a test dataset into the ETL ML pipeline being validated. The output schema may describe the data fields (e.g., data structures and data structure features without reference to their associated data values) within the actual output dataset.

The validator rule definition interface may present a dataspace manager with an interface to describe validator rules. Validator rules may comprise check-type rules defining intended characteristics of data items within an actual output dataset with reference to data fields within the output schema. Validator rules may comprise compute-type validator rules defining relations between data fields within the ETL ML model and data fields within the output schema. The ETL ML model referenced by the validator rule definition interface may be the same ETL ML model implemented within the ETL ML pipeline. These validator rules may be described according to pre-set instructions referred to herein as validation definition language ("VDL pre-sets"). The VDL pre-sets may be stored in a VDL library. The validator rules may approximate the ETL processes manifested in the dataspace manager's construction of the training output portion of the training dataset. The training dataset may be the dataset used to train the underlying ETL ML algorithm and generate the ETL ML model.

After the validator rules have been defined, the expected output engine may generate an expected output dataset for the test dataset based on the output schema, the validator rules, and the test dataset. The expected output dataset may be generated by searching the test dataset for the ETL ML model data fields referenced in the compute-type validator rules. Where the referenced data fields are found in the test dataset, the values stored at the referenced data fields may be used to populate the validator rule related data fields in the output schema. Before population, test dataset values may be transformed according to computations as defined in the compute-type validator rules. This population of the output schema may generate an expected output dataset. Further, the check-type validator rules may be referenced to ensure that the population of the output schema and generation of the expected output dataset do not violate the output schema data item characteristic checks defined in the check-type validator rules.

The actual output dataset may then be compared with the expected output dataset in the validation engine to generate validation metrics regarding the validity of the ETL ML pipeline as to the test dataset. In some examples, the validator rules may be utilized to define the behavior of the validation engine when comparing the actual output dataset with the expected output dataset to generate validation metrics. For instance, a check-type validator rule may be utilized to determine if characteristics of data items within the actual output dataset violate checks defined in the check-type validator rules.

The validation process described above may be repeated in a subsequent iteration for a subsequent test dataset, wherein the subsequent test dataset is also drawn from the input dataspace. The subsequent test dataset is fed into the ETL ML pipeline to generate a subsequent actual output dataset. This subsequent actual output dataset is fed into the output schema engine to generate a subsequent output schema. Where the initial test dataset and the subsequent test dataset comprise the same input dataspace, data fields may reappear across the initial actual output dataset and the subsequent actual output dataset. Because output schema engine preserves the data fields of actual output datasets in generated output schema, the data fields from the initial output schema may reappear within the subsequent output schema. Where data fields from the initial output schema reappear in the subsequent output schema, validator rules referencing those data fields may be reused to generate subsequent expected output datasets in the subsequent iteration. These subsequent expected output datasets may then be compared with the subsequent actual output dataset to generate metrics regarding the validity of the ETL ML pipeline, as pertaining to the subsequent test dataset.

As each subsequent test dataset is fed into the ETL ML pipeline over multiple iterations of the validation process disclosed herein, validation metrics for the ETL ML pipeline as to each test dataset may be generated. In some examples, where the ETL ML pipelines validation metrics fall below a threshold, the execution of the ETL ML pipeline on test datasets may be halted. This halting may avoid wasting further time and energy on a potentially invalid ETL ML pipeline, or on generating a potentially invalid output dataspace.

As described above, the reuse of validator rules in a subsequent iteration allows for validation of a subsequent test dataset without employment of the validator rule definition interface. Because the validator rule definition interface requires user interaction to define validator rules, each iteration of the validation process omitting employment of the validator rule definition interface reduces the requirements for user interaction. Compared to the other computer-executable steps of the described validation process, the required user-interactions for the validator rule definition interface may be considered labor intensive. As such, the disclosed systems and methods may reduce the requirement for labor-intensive efforts when validating an ETL ML pipeline against subsequent test datasets. Where the input dataspace comprises multiple test datasets, validation of an ETL ML pipeline against some of those multiple test datasets (i.e. those datasets processed during an iteration omitting the validator rule definition interface) may be achieved without labor-intensive user-interactions.

In some examples, a subsequent iteration of the validation process may employ the validator rule definition interface if a defined number of previous iterations of the validation process omitted employment of the validator rule definition interface. In some examples, subsequent iterations of the validation process may employ the validator rule definition interface until the ETL ML pipeline has been validated against a defined number of test datasets. In some examples, validator rules may be accumulated across multiple iterations of the validation process, and iterations of the validation process may employ the validator rule definition interface until a defined number of validator rules have been accumulated.

Methods requiring repeated user interaction risk human error, and methods requiring parallel ML pipelines rely on ML models of unknown validity. As such, previous ETL ML pipeline validation methods are less reliable than the disclosed methods. Therefore, the above disclosed methods improve the performance of the implementing systems at least because systems implementing the disclosed methods generate more reliable ETL ML pipeline validity determinations.

"Initial" is used herein to refer to the test dataset, output schema, etc. which were associated with the initial iteration of the validation process, i.e., the iteration wherein the validator rules were defined.

"Reappearance" of a data field as used herein may refer to an identical, similar, or analogous data field appearing across multiple output schema, across multiple actual output datasets, or across multiple test datasets. Data fields may be considered to have "reappeared" despite comprising values different from the values comprising the data fields in a previous appearance. Data fields may reappear across multiple output schema and across multiple actual output databases. For instance, where the initial test dataset and the subsequent test dataset comprise the same input dataspace, data fields may reappear across the initial actual output dataset and the subsequent actual output dataset; Because output schema engine preserves the data fields of actual output datasets in generated output schema, the data fields from the initial output schema may reappear within the subsequent output schema. Similarly, data fields in an ETL ML model may reappear across multiple test datasets where the test datasets were drawn from the input dataspace.

"Dataspace managers" (e.g. network administrators, database upgrade planners, IT personnel) are referenced herein to create an intuitive context for the disclosure. This convention should not be interpreted as limiting; In some examples, any user or program may complete the disclosed actions of dataspace managers or express the disclosed intentions of dataspace managers. Further, there may be more than one dataspace manager; References to a "dataspace manager" in one area of the disclosure does not necessarily mean that the same dataspace manager is required by references to a "dataspace manager" in other areas of the disclosure.

FIG. 1 illustrates an example ETL ML pipeline validation system 100, in accordance with examples disclosed herein. ETL ML pipeline device 110 may comprise a processor 112 and a computer readable media 114. Computer readable media 114 may comprise executable instructions and data stores. Executable instructions are depicted as rectangles while data stores are depicted as cylinders, however this convention should not be treated as limiting; In some examples, a disclosed executable instruction may instead be conceptualized as a data store, and vice versa. Processor 112 may read executable instructions from computer readable media 114 in order to carry out disclosed processes and methods. Processor 112 may utilize data stores comprising computer readable media 114 as inputs or to store output data when executing the executable instructions.

While processor 112 executes the instructions associated with the actions disclosed herein, for the sake of brevity, such actions may be described as being taken by the associated set of instructions (referred to herein as an "engine," "module," "application," etc.). Such actions may not be explicitly described as being taken by any specific actor. Unless a different processor is indicated, processor 112, or a processor housed on the device containing the associated set of instructions, is still to be understood as executing the instructions associated with the action. Further, while components of ETL ML pipeline device 110 are disclosed herein as being housed locally, in some examples one or more of the components may instead be housed on a remote device, with such remotely housed components communicating with locally housed components via a wired or wireless interface.

Processor 112 may refer to one or more general purpose processors (e.g. microprocessors) and/or one or more special purpose processors (e.g., graphics processing units ("GPUs"), network processors, or application-specific integrated circuits ("ASICs")). Further, in examples where multiple processors are represented by processor 112, said processors may be operated in parallel so that multiple instruction sets may be simultaneously executed by processor 112. Further, one or more of processor(s) 112 may be located on remote devices, with the processor(s) located on remote devices communicating with local processor(s) via a wired or wireless interface.

Computer readable media 114 may comprise any form of information storage including, but not limited to, static and dynamic, volatile and non-volatile, as well as long term and short term storage. Computer readable media 114 may comprise a combination of different storage media with physical and/or logical separation. In addition, data and/or instructions stored on computer readable media 114 may be stored partially across a plurality of storage media. For instance, while executing a set of instructions of one application, processor 112 may write some amount of data from ROM to RAM, such that processor 112 will be able to more quickly access that data while executing remaining instructions within the application. This writing of data from ROM to RAM does not remove the data from computer readable media 114, because computer readable media 114 may refer collectively to any and all forms of machine or computer readable media accessible by the processor (e.g., RAM, ROM, flash drives, processor caches). Further, in some examples, one or more portions of computer readable media 114 may be located on remote devices, with the portions located on remote devices receiving/transmitting the contained data and or instructions via a wired or wireless interface.

Computer readable media 114 may comprise a training dataset 120. Although not depicted in FIG. 1, the training dataset 120 may comprise a training input portion sampled from the input dataspace and a training output portion. The input dataspace is the one or more data structures intended to be transformed into one or more data structures comprising the output dataspace. The training input portion may have been built by any method for sampling from one or more data structures (e.g., random, systematic, clustered). The training output portion of the training dataset comprises one or more data structures representing what would be generated if the intended transformations for the input dataspace were applied to the training input portion. The training output portion of the training dataset 120 may have been built by a dataspace manager conceptualizing the intended transformations as an ETL process, writing instructions for the ETL process with reference to data items within the training input portion, and then applying the ETL process to the training input portion. The training dataset may have been built by the dataspace manager individually populating values within the training output portion after reviewing the training input portion. In any case, training dataset 120 may manifest ETL processes based on intended transformations held by dataspace managers when constructing the training output portion. In some examples, the dataspace manager may build the training dataset 120 at a device remote from the ETL ML pipeline device 110 with the training dataset 120 communicated to the ETL ML pipeline device 110 via a wired or wireless communication interface.

ETL ML algorithm 122 may be trained on training dataset 120 to generate ETL ML model 124. This training process may involve drawing relations between data items within the training input portion and data items within the training output portion of training dataset 120. These relations may reflect extrapolated ETL processes based on patterns within the manifested ETL processes. ETL ML model 124 may comprise these drawn relations and the extrapolated ETL processes they reflect. ETL ML model 124 additionally may comprise data fields matching data fields present within the training input portion. The coverage of the ETL ML model 124 regarding data fields present within the input dataspace may not be complete, e.g., where the training dataset used to train the ETL ML algorithm was inadequately and/or unrepresentatively sampled from the input dataspace.

ETL ML model 124 may be implemented within ETL ML pipeline 126. After implementation of the ETL ML model 124 within ETL ML pipeline 126, test datasets 128A-N may be fed into ETL ML pipeline 126 to generate actual output datasets 140A-N.

Note that where a component of ETL ML pipeline validation system 100 has been denoted with a number followed by an "N," and there is a "( . . . )" depicted nearby, the component is meant to represent a final instantiation in a series of repeated components. The total number of components may be any number. For instance, test datasets 128A-N refers to all the test datasets, but in some examples, test datasets 128A-N may comprise one test dataset (alternatively enumerated as 128A); In other examples, test datasets 128A-N may comprise multiple test datasets. In the disclosed ETL ML pipeline validation system 100, 128N refers to the "Nth" or last test dataset. This convention applies for remote devices 130A-N, computer readable media 132A-N, data structures 134A-N, actual output datasets 140A-N, output schema 144A-N and expected output datasets 154A-N.

In the disclosed ETL ML pipeline validation system 100, all of test datasets 128A-N are drawn from the same input dataspace, i.e., the input dataspace that the training input portion was sampled from. The input dataspace comprises data structure(s) 134A-N. Data structure(s) 134 A-N are distributed across multiple devices connected to each other via network 136. Network 136 may comprise any network type (e.g., LAN, WAN, the Internet) and any underlying communication medium (e.g., WiFi, Bluetooth, ethernet cables). Remote device 130A contains two data structures 134A-B on computer readable media 132A, remote device 130B contains data structure 134C on computer readable media 132B, ETL ML pipeline device 110 contains data structure 134D on computer readable media 114, and remote devices 130C-N contain data structure(s) 134D-N stored across computer readable media 132C-N. As can be seen from the disclosed example, data structure(s) 134A-N are distributed across multiple computer readable media present on different devices. In some examples, data structure(s) 134A-N may instead be present only on the ETL ML pipeline device 110. In some examples, data structure(s) 134A-N may be present only on remote device(s). Each of test dataset 128A-N are drawn from the input dataspace, (i.e., data structure(s) 134A-N).

Test dataset 128A-N may be drawn at random from all of data structure(s) 134A-N, such that each test dataset 128A-N is structured as a representative sample of the input dataspace as a whole. In some examples, each test dataset 128A-N may be drawn according to a function or user direction. Further, in the disclosed example, the drawing of test datasets 128A-N is not limited by physical or logical arrangement of the data structure(s) from which it is drawn. For instance, both data structures 134A and 134D may be a source for test dataset 128A, even though data structures 134A and 134D are stored in computer readable media which are physically and logically separated from each other. In some examples, such drawing of test datasets 128A-N may be limited by physical and/or logical separation. Test datasets 128A-N may comprise any data item drawn from any of data structure(s) 134A-N.

The first test dataset 128A may be fed into the ETL ML pipeline 126 in order to generate first actual output dataset 140A. First actual output dataset 140A may be fed into output schema engine 142 to generate first output schema 144A. The first output schema 144A describes the data fields within the first actual output dataset 140A. The output schema engine 142 is described in further detail below in relation to FIG. 2.

The first output schema 144A, ETL ML model 124 and VDL library 148 may be utilized by the validator rule definition interface 146 to display a user interface (UI) to a dataspace manager. The displayed UI may allow the dataspace manager to define check-type validator rules defining intended characteristics of data items within an actual output dataset with reference to data fields within the first output schema 144A. The displayed UI may allow the dataspace manager to define compute-type validator rules defining relations between data fields within ETL ML model 124 and data fields within first output schema 144A. In some examples the validator rule definition interface 146 may interface with the user via any method of communicating with a user (e.g. voice-user interface, touch pad, command line). The dataspace manager interfacing with the validator rule definition interface 146 may be, but need not be, the same dataspace manager that built the training dataset. The UI may present selectable VDL pre-sets stored in VDL library 148, which may be selected to assist in describing validator rules.

Once the dataspace manager defines the compute-type validator rules and check-type validator rules, the validator rule definition interface 146 may combine the compute-type and check-type validator rules to generate validator rules 150. In some examples, the validator rules 150 may be used to populate output schema 144A to create a validator rule-populated output schema (not depicted in FIG. 1). The validator rule-populated output schema allows for less items to be passed to components taking in both output schema 144A and validator rules 150. A validator rule-populated output schema is disclosed in FIGS. 8-10 to provide for more concise illustration. The validator rule definition interface 146, VDL library 148, validator rule generation process, and UI is described in further detail below in relation to FIGS. 3-8.

The validator rules 150, first output schema 144A and first test dataset 128A may be fed into the expected output engine 152 to generate first expected output dataset 154A. First expected output dataset 154A may be generated by searching test dataset 128A for reappearances of the ETL ML model 124 data fields referenced in the compute-type validator rules. Where the referenced data fields reappear in first test dataset 128A, the values stored at the referenced data fields may be used to populate the validator rule related data fields in first output schema 144A. Before population, first test dataset 128A's values may be transformed according to computations as defined in the compute-type validator rules. This population of first output schema 144A may generate first expected output dataset 154A. Further, the check-type validator rules may be referenced to ensure that the population of first output schema 144A and generation of first expected output dataset 154A do not violate first output schema 144A data item characteristic checks defined in the check-type validator rules. The expected output engine 152 is described in further detail below in relation to FIG. 9.

First actual output dataset 140A may then be compared with first expected output dataset 154A in validation engine 156 to generate validation metrics 158 regarding the validity of the ETL ML pipeline 126 as to first test dataset 128A. In some examples, validator rules 150 may be utilized to define the behavior of validation engine 156 when comparing first actual output dataset 140A with first expected output dataset 154A to generate validation metrics 158. The validation engine 156 is described in further detail below in relation to FIG. 10.

After the first test dataset 128A has been fed into the ETL ML pipeline 126, a dataspace manager has interacted with the UI, and the validator rule definition interface 146 has generated validator rules 150, a second test dataset 128B may be fed into ETL ML pipeline 126 to generate a second actual output dataset 140B. Second actual output dataset 140B may be fed into output schema engine 142 to generate a second output schema 144B.

Validator rules 150 were already generated during the previous iteration of the ETL ML pipeline based on first test dataset 128A. Where validator rules 150 comprise references to data fields which reappeared within second output schema 144B and/or second test dataset 128B, validator rules 150 may be reused during this second iteration of the validation process. Such reappearing data fields, originally defined with reference to first output schema 144A and/or ETL ML model 124, allow for reuse of validator rules 150 because the reappearing data fields may also be found with reference to second output schema 144B and/or second test dataset 128B.

Because validator rules 150 may be reused during the second iteration of the validation process, validator rule definition interface 146 may not need to be executed again. Second test dataset 128B, second output schema 144B, and validator rules 150 may be fed into expected output engine 152 to generate second expected output dataset 154B. Second expected output dataset 154B, second actual output dataset 140B, and validator rules 150 may be fed into validation engine 156 to validation metrics regarding the validity of ETL ML pipeline 126 as to second test dataset 128B. These validation metrics may be used to update or overwrite ETL ML pipeline validation metrics 158.

This validation process may be iterated again for each test dataset 128C-N such that the ETL ML pipeline 126 is continually validated as the test dataset 128C-N. Because the input dataspace comprises data structure(s) 134A-N, and test datasets 128A-N are drawn from data structure(s) 134A-N, the actual output datasets 140A-N generated by feeding test datasets 128A-N through the ETL ML pipeline relate to the output dataspace. Where the test datasets 128A-N in combination comprise all data structures 134A-N comprising the input dataspace, the actual output dataset 140A-N may in combination represent the output dataspace. Where the output dataspace matches the transformation intentions of the dataspace manager regarding the input dataspace, the method of transformation (e.g., ETL ML pipeline 126) was successful.

As discussed above, input dataspaces comprising multiple test datasets may require repeated user-interaction to validate the ETL ML pipeline for each test dataset. Therefore, the ability to exclude user-interaction from some iterations of the ETL ML pipeline validation process, as was done by excluding employment of validator rule definition interface 146 during the second iteration described above, may reduce user-interaction requirements of ETL ML pipeline validation system 100. The contrast between an initial iteration of a validation process and a subsequent iteration of a validation process, wherein user-interaction based validator rule generation may be omitted, is further detailed below in reference to FIGS. 11-12.

Figure 2:
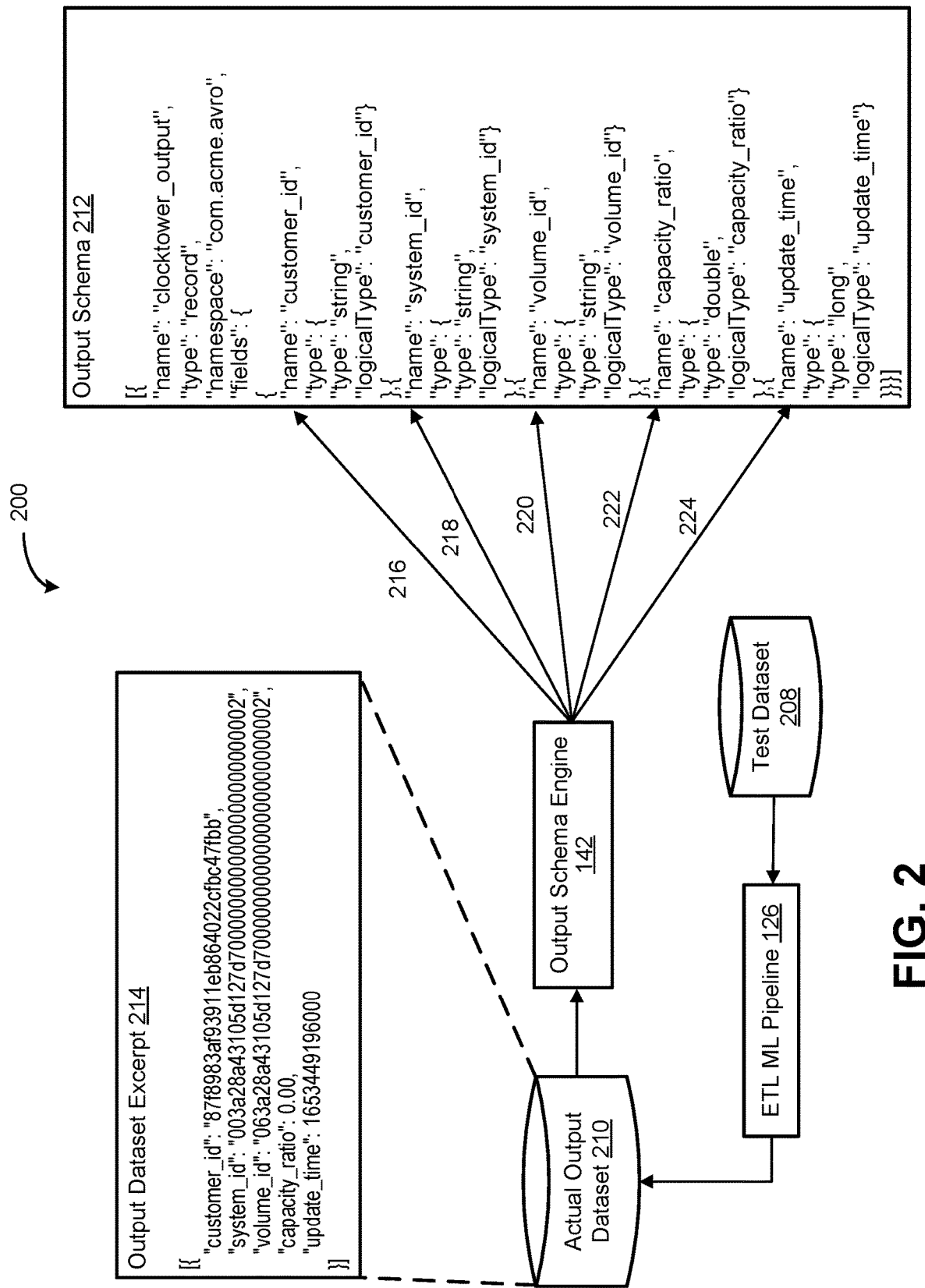
FIG. 2 illustrates example data flows between components of an ETL ML pipeline validation system that may occur during an output schema generation process, in accordance with examples disclosed herein.

FIGS. 2-10 illustrate example data flows between components of an ETL ML pipeline validation system 100 during a validation iteration. As discussed in further detail below, validation iterations may be differentiated as initial or subsequent validation iterations based on whether the validation iteration executes a user-interaction based validator rule generation process. FIG. 2 illustrates example data flows between components of an ETL ML pipeline validation system 100 that may occur during an output schema generation process 200, in accordance with examples disclosed herein. Actual output dataset 210 is generated after feeding test dataset 208 into ETL ML pipeline 126. Actual output dataset 210 is then fed into output schema engine 142 to generate output schema 212.

Output dataset excerpt 214 illustrates one potential format of actual output dataset 210. Output dataset excerpt 214 is illustrated as data items formatted in JavaScript Object Notation ("JSON"). However data items, including the data values and data fields from which data values are pulled, may be in any format capable of defining data items (e.g., extensible markup language ("XML"), Apache Avro ("Avro"), Yet Another Markup Language ("YAML")).

Output dataset excerpt 214 contains field-value pairs relating to specific items within the actual output dataset 210. For instance, the field "customer_id" is paired with a value of "87f8983 af93911eb864022cfbc47fbb." Output schema engine 142 builds output schema 212 by populating output schema 212 with copies of the fields within actual output dataset 210. Output schema engine 142 may additionally carry over features describing the copied fields. Output schema population actions 216-224 need not occur in any particular order. Output schema population action 216 creates a field in output schema 212 for a "customer_id" field, wherein the data type feature is indicated as "string." Output schema population action 218 creates a field in output schema 212 for a "system_id" field, wherein the data type feature is indicated as "string." Output schema population action 220 creates afield in output schema 212 for a "volume_id" field, wherein the data type feature is indicated as "string." Output schema population action 222 creates a field in output schema 212 for a "capacity_ratio" field, wherein the data type feature is indicated as "double." Output schema population action 224 creates a field in output schema 212 for a "update_time" field, wherein the data type feature is indicated as "long."

The data values of the field-value pairs have been excluded from output schema 212 because the values for each key may be specific to actual output dataset 210. Output schema 212 is meant to be used as a reference for validator rules. Data fields within output schema 212 may reappear across multiple actual output datasets, leading to reappearance of the data fields across multiple output schema. Though the data structures may reappear, they will not necessarily have the same values. This is why the output schema 212 may comprise only data fields, and need not comprise the specific values within those fields. As described in further detail below with reference to FIGS. 11-12, validator rules may be reused in a later iteration of the validation process comprises a reappearance of data fields referenced in the validator rules. As such, output schema engine 142 may generate output schema 212 with an emphasis on retaining data fields from the actual output dataset 210.

Figure 3:
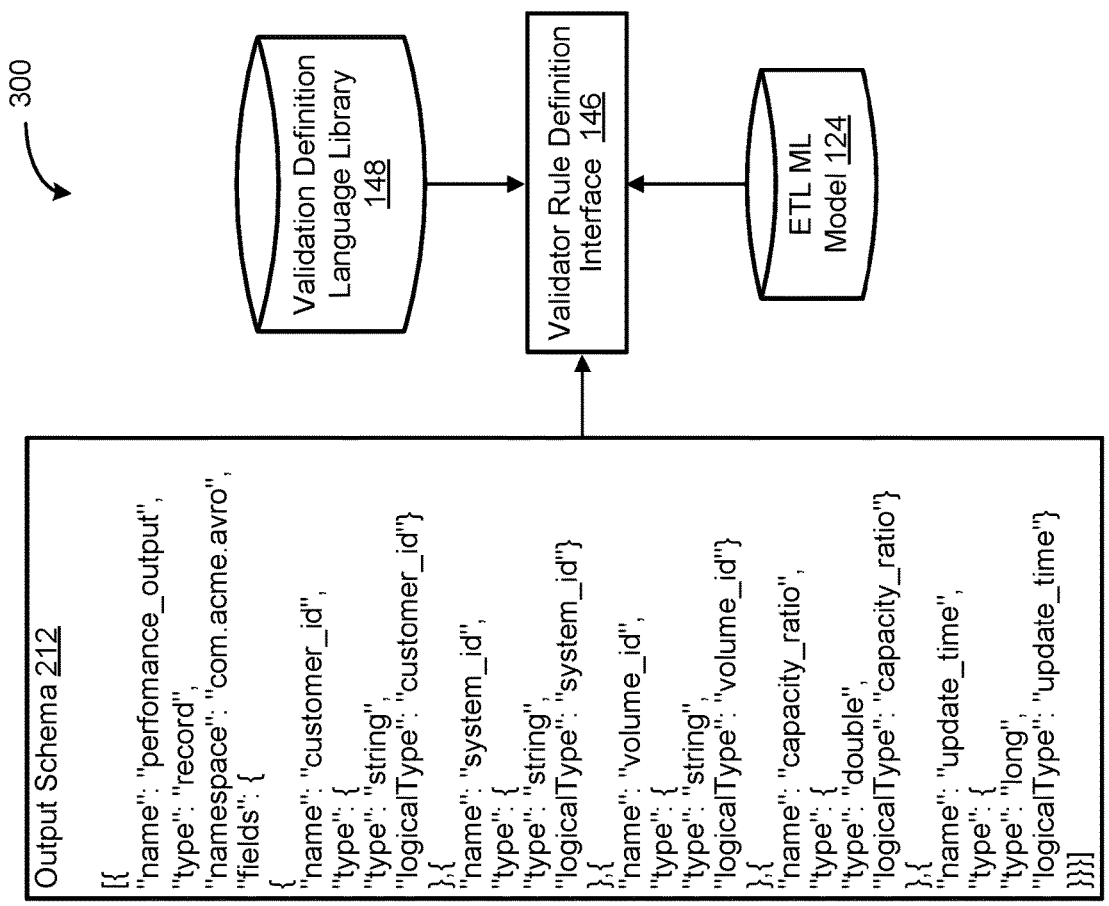
FIG. 3 illustrates an example input phase of a validator rule generation process, in accordance with examples disclosed herein. ETL ML model, output schema, and VDL library are fed into the validator rule definition interface.

FIGS. 3-8 illustrate example data flows between components of an ETL ML pipeline validation system 100 during a user-interaction based validator rule generation process carried out by validator rule definition interface 146. FIG. 3 illustrates an example input phase 300 of a validator rule generation process, in accordance with examples disclosed herein. ETL ML model 124, output schema 212, and VDL library 148 are fed into the validator rule definition interface 146.

As described above, the ETL ML model 124 may comprise data fields which reappear across multiple test datasets, for instance, where the test datasets were drawn from the input dataspace. The coverage of the ETL ML model 124 regarding data fields present within the input dataspace may not be complete, e.g., where the training dataset used to train the ETL ML algorithm was inadequately and/or unrepresentatively sampled from the input dataspace. In addition, as described above in relation to FIG. 2, the output schema 212 may comprise data fields which reappear across multiple output schema.

VDL library 148 may comprise a list of VDL pre-sets. These VDL pre-sets may assist in describing validator rules. In some examples, no VDL pre-sets are used and VDL library 148 may be omitted as an input to validator rule definition interface 146.

In the present disclosure, validator rules may be categorized as "check-type" or "compute-type." In some examples, validator rules may be categorized in other ways, or not categorized at all. Check-type validator rules may define intended characteristics of data items within an actual output dataset, with reference to data fields within an output schema. Compute-type validator rules may define relations between data fields within an ETL ML model and data fields within an output schema. The validator rule definition interface 146 may present a user interface ("UI") to a dataspace manager, wherein the user interface displays representations of data fields within the ETL ML model 124 and data fields within output schema 212. The dataspace manager may use the UI to describe check-type validator rules with reference to data fields within the output schema 212. The dataspace manager may use the UI to describe compute-type validator rules defining relations between data fields within the ETL ML model 124 and data fields within the output schema 212. Validator rules may be described according to a selectable VDL pre-set, wherein the VDL pre-set was pulled from VDL library 148.

Validator rules may be described herein with reference to singular intake and result data fields, however such validator rules may also intake multiple data fields to calculate multiple result data fields. For instance, an "add" compute-type validator rule may instead add together values from any number of intake data fields to compute a value for a result data field in an output schema, despite being disclosed as referencing below as adding only two intake data fields. The following description comprises a list of example validator rules and associated VDL pre-sets. The described list is non-exhaustive; More validator rules and/or their associated VDL pre-sets may be derived or built based on the disclosure herein.

A "dateTypeCheck" VDL pre-set may describe a check-type "dateTypeCheck" validator rule. The "dateTypeCheck" validator rule may comprise a reference to a data field within output schema 212. The "dateTypeCheck" validator rule may be fed into validation engine 156 to check any actual output dataset comprising a reappearance of the referenced data field. The value at the referenced data field may be checked to confirm whether the value is in a date format specified in the "dateTypeCheck" validator rule. The validation engine 156 may generate validation determinations depending on whether the value was in the specified format. The "dateTypeCheck" validator rule may be fed into expected output engine 152 to generate an expected output dataset. Where the referenced data field reappears in an output schema fed into the expected output engine 152, the expected output engine 152 may format the value stored at the referenced data field within the expected output database. The formatting applied by expected output engine 152 may be the date format specified in the "dateTypeCheck" validator rule.

A "listValueCheck" VDL pre-set may describe a check-type "listValueCheck" validator rule. The "listValueCheck" validator rule may comprise a reference to a data field within output schema 212. The "listValueCheck" validator rule may be fed into validation engine 156 to check any actual output dataset comprising a reappearance of the referenced data field. The value at the referenced data field may be checked to confirm whether the value is in a list of values specified in the "listValueCheck" validator rule. The validation engine 156 may generate validation determinations depending on whether the value was in the list of values. The "listValueCheck" validator rule may be fed into expected output engine 152 to generate an expected output dataset. Where the referenced data field reappears in an output schema fed into the expected output engine 152, the expected output engine 152 may insert a value into the referenced data field within the expected output database. The value inserted by expected output engine 152 may be a value from the list of values specified in the "listValueCheck" validator rule.

A "rangeCheck" VDL pre-set may describe a check-type "rangeCheck" validator rule. The "rangeCheck" validator rule may comprise a reference to a data field within output schema 212. The "rangeCheck" validator rule may be fed into validation engine 156 to check any actual output dataset comprising a reappearance of the referenced data field. The value at the referenced data field may be checked to confirm whether the value falls within a range of values specified in the "rangeCheck" validator rule. The validation engine 156 may generate validation determinations depending on whether the value was in the range of values. The "rangeCheck" validator rule may be fed into expected output engine 152 to generate an expected output dataset. Where the referenced data field reappears in an output schema fed into the expected output engine 152, the expected output engine 152 may insert a value into the referenced data field within the expected output database. The value inserted by expected output engine 152 may be a value from within the range of values specified in the "rangeCheck" validator rule.

A "formatCheck" VDL pre-set may describe a check-type "formatCheck" validator rule. The "formatCheck" validator rule may comprise a reference to a data field within output schema 212. The "formatCheck" validator rule may be fed into validation engine 156 to check any actual output dataset comprising a reappearance of the referenced data field. The value at the referenced data field may be checked to confirm whether the value is in a format specified in the "formatCheck" validator rule. The validation engine 156 may generate validation determinations depending on whether the value was in the specified format. The "formatCheck" validator rule may be fed into expected output engine 152 to generate an expected output dataset. Where the referenced data field reappears in an output schema fed into the expected output engine 152, the expected output engine 152 may format a value into the referenced data field within the expected output database. The formatting applied by expected output engine 152 may be a format specified in the "formatCheck" validator rule.

A "consistencyCheck" VDL pre-set may describe a check-type "consistencyCheck" validator rule. The "consistencyCheck" validator rule may comprise a reference to a data field within output schema 212. The "consistencyCheck" validator rule may be fed into validation engine 156 to check any actual output dataset comprising a reappearance of the referenced data field. The referenced data field or its value may be checked to confirm whether the referenced data field or value appears in the actual output dataset a number of times specified in the "consistencyCheck" validator rule. The validation engine 156 may generate validation determinations depending on whether the referenced data field or value appears in the actual output dataset the specified number of times. The "consistencyCheck" validator rule may be fed into expected output engine 152 to generate an expected output dataset. Where the referenced data field reappears in an output schema fed into the expected output engine 152, the expected output engine 152 may add or remove data items from the expected output database. The addition or removal of data items by expected output engine 152 may continue until the referenced data field or value appears in the actual output dataset a number of times specified in the "consistencyCheck" validator rule.

A "uniquenessCheck" VDL pre-set may describe a check-type "uniquenessCheck" validator rule. The "uniquenessCheck" validator rule may comprise a reference to a data field within output schema 212. The "uniquenessCheck" validator rule may be fed into validation engine 156 to check any actual output dataset comprising a reappearance of the referenced data field. The referenced data field or its value may be checked to confirm whether the referenced data field or value appears again in the actual output dataset. The validation engine 156 may generate validation determinations depending on whether the referenced data field or value appears again in the actual output dataset. The "uniquenessCheck" validator rule may be fed into expected output engine 152 to generate an expected output dataset. Where the referenced data field reappears in an output schema fed into the expected output engine 152, the expected output engine 152 may remove data items from the expected output database. The removal of data items by expected output engine 152 may continue until the referenced data field or appears in the actual output dataset only once in the expected output database.

A "directCompare" VDL pre-set may describe a compute-type "directCompare" validator rule. The "directCompare" validator rule may comprise a relation drawn between a specified intake data item and a result data field within output schema 212. The "directCompare" validator rule may be fed into expected output engine 152 to generate an expected output dataset. If a result data field reappears in an output schema fed into the expected output engine 152, then an expected output dataset may be generated. The expected output dataset may comprise a reappearance of a result data field, wherein value stored at the reappearing result data field is set to a value from the specified intake data item.

A "directMapping" VDL pre-set may describe a compute-type "directMapping" validator rule. The "directMapping" validator rule may comprise a relation drawn between an intake data field within ETL ML model 124 and a result data field within output schema 212. The "directMapping" validator rule may be fed into expected output engine 152 to generate an expected output dataset. If result data fields reappear in an output schema fed into the expected output engine 152, and intake data fields reappear in a test dataset fed into the expected output engine 152, then an expected output dataset may be generated. The expected output dataset may comprise a reappearance of a result data field, wherein the value stored at the reappearing result data field is set to a value from a reappearing intake data field within the test dataset.

An "isNull" VDL pre-set may describe a compute-type "isNull" validator rule. The "isNull" validator rule may comprise a relation drawn between an intake data field within ETL ML model 124 and a result data field within output schema 212. The "isNull" validator rule may be fed into expected output engine 152 to generate an expected output dataset. If result data fields reappear in an output schema fed into the expected output engine 152, and intake data fields reappear in a test dataset fed into the expected output engine 152, then an expected output dataset may be generated. The expected output dataset may comprise a reappearance of a result data field. The value stored at the reappearing result data field is set to a value specified in the "isNull" validator rule if the value at a reappearing intake data field within the test dataset is null.

An "add" VDL pre-set may describe a compute-type "add" validator rule. The "add" validator rule may comprise a relation drawn between two intake data fields within ETL ML model 124 and a result data field within output schema 212. The "add" validator rule may be fed into expected output engine 152 to generate an expected output dataset. If the result data field reappears in an output schema fed into the expected output engine 152, and the intake data fields reappear in a test dataset fed into the expected output engine 152, then an expected output dataset may be generated. The expected output dataset may comprise a reappearance of the result data field. The value stored at the reappearing result data field is calculated by adding the value at one reappearing intake data field within the test dataset with the value at the other reappearing intake data field within the test dataset. Similar compute-type validator rules may be created for other mathematical operations (e.g., subtract, multiply, divide, exponent).

A "compare" VDL pre-set may describe a compute-type "compare" validator rule. The "compare" validator rule may comprise a relation drawn between an intake data field within ETL ML model 124 and a result data field within output schema 212. The "compare" validator rule may be fed into expected output engine 152 to generate an expected output dataset. If result data fields reappear in an output schema fed into the expected output engine 152, and intake data fields reappear in a test dataset fed into the expected output engine 152, then an expected output dataset may be generated. The expected output dataset may comprise a reappearance of a result data field. The value stored at the reappearing result data field is set to a value specified in the "compare" validator rule depending on a test conducted on a reappearing intake data field within the test dataset. The conducted test may be specified in the "compare" validator rule.

A "countCompare" VDL pre-set may describe a compute-type "countCompare" validator rule. The "countCompare" validator rule may comprise a relation drawn between an intake data field within ETL ML model 124 and a result data field within output schema 212. The "countCompare" validator rule may be fed into expected output engine 152 to generate an expected output dataset. If result data fields reappear in an output schema fed into the expected output engine 152, and intake data fields reappear in a test dataset fed into the expected output engine 152, then an expected output dataset may be generated. The expected output dataset may comprise a reappearance of a result data field. The value stored at the reappearing result data field is set to a value specified in the "countCompare" validator rule based on a count of data items within the test dataset which pass a test specified in the "countCompare" validator rule.

A "logicalCompare" VDL pre-set may describe a compute-type "logicalCompare" validator rule. The "logicalCompare" validator rule may comprise a relation drawn between an intake data field within ETL ML model 124 and a result data field within output schema 212. The "logicalCompare" validator rule may be fed into expected output engine 152 to generate an expected output dataset. If result data fields reappear in an output schema fed into the expected output engine 152, and intake data fields reappear in a test dataset fed into the expected output engine 152, then an expected output dataset may be generated. The expected output dataset may comprise a reappearance of a result data field. The value stored at the reappearing result data field is set to a value specified in the "logicalCompare" validator rule depending on a logical comparison conducted on a reappearing intake data field within the test dataset. The logical comparison may be specified in the "compare" validator rule, and may be based on any relational operator (e.g., less than, equal to, at least).

An "epochConverter" VDL pre-set may describe a compute-type "epochConverter" validator rule. The "epochConverter" validator rule may comprise a relation drawn between an intake data field within ETL ML model 124 and a result data field within output schema 212. The "epochConverter" validator rule may be fed into expected output engine 152 to generate an expected output dataset. If result data fields reappear in an output schema fed into the expected output engine 152, and intake data fields reappear in a test dataset fed into the expected output engine 152, then an expected output dataset may be generated. The expected output dataset may comprise a reappearance of a result data field. The value stored at the reappearing result data field is set to a value in a reappearing intake data field within the test dataset, wherein the value stored at the reappearing result data field is formatted according to a date format. The date format may be specified in the "epochConverter" validator rule.

An "addMonth" VDL pre-set may describe a compute-type "addMonth" validator rule. The "addMonth" validator rule may comprise a relation drawn between two intake data fields within ETL ML model 124 and a result data field within output schema 212. The "addMonth" validator rule may be fed into expected output engine 152 to generate an expected output dataset. If result data fields reappear in an output schema fed into the expected output engine 152, and the intake data fields reappear in a test dataset fed into the expected output engine 152, then an expected output dataset may be generated. The expected output dataset may comprise a reappearance of a result data field. The value stored at the reappearing result data field is set to a date formatted value in one reappearing intake data field within the test dataset, wherein the months component of the date formatted value has been increased by the months component of a date formatted value in the other reappearing intake data field within the test dataset. Similar compute-type validator rules for basic date format computations may be created for other mathematical operations and date fields (e.g., subtractMonth, multiplySecond, divideHour).

A "passing" VDL pre-set may describe a compute-type "passing" validator rule. The "passing" validator rule may comprise a reference to a result data field within output schema 212. The "passing" validator rule may be fed into expected output engine 152 to generate an expected output dataset. If a result data field reappears in an output schema fed into the expected output engine 152, then an expected output dataset may be generated. The expected output dataset may comprise a reappearance of a result data field, wherein the value stored at the reappearing result data field is set to the value of the result data field as it appears within the actual output dataset. In some examples, the reappearing result data field may be flagged or set to a null value. The effect of the value stored at the reappearing result data field within the expected output dataset is to pass the result data field through the validation engine without generating negative validation determinations. For instance, where the value of the reappearing result data field within the expected output dataset is set to the value of the result data field as it appears within the actual output dataset, the expected output dataset and actual output dataset may match each other when passed to the validation engine, at least as to value of the result data field.

Figure 4:
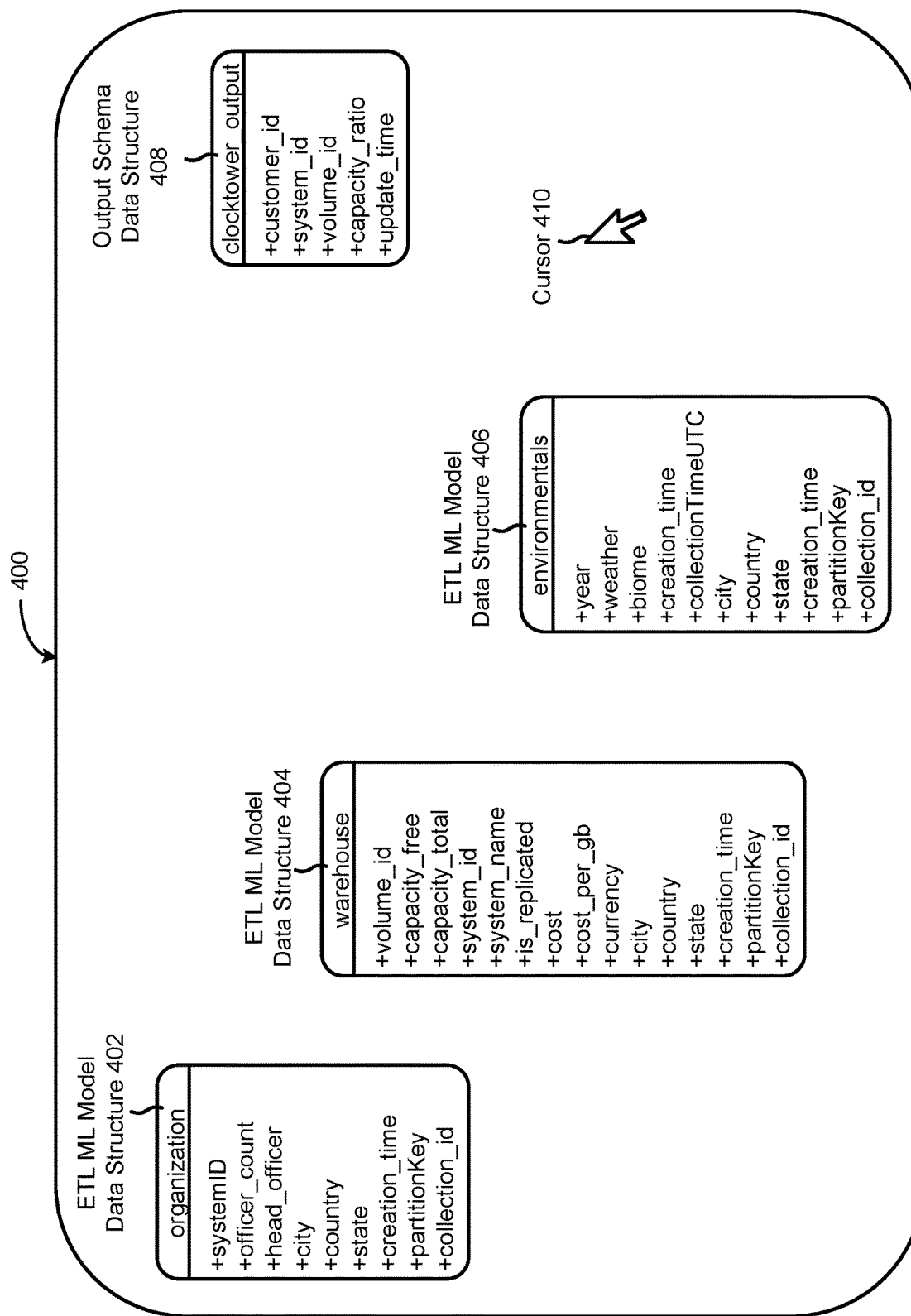
FIG. 4 illustrates an example first UI interaction of a validator rule generation process, in accordance with examples disclosed herein.

FIGS. 4-7 illustrate an example UI which may be presented to a dataspace manager in validation iterations where validator rules are described by a dataspace manager, in accordance with examples disclosed herein. As discussed in further detail below relating to FIGS. 11-12, validation iterations may be executed which exclude the description of new validator rules, such input from a dataspace manager is avoided. FIG. 4 illustrates an example first UI interaction 400 of a validator rule generation process, in accordance with examples disclosed herein. The first UI interaction 400 presents one or more ETL ML model data structures 402-406 and an output schema data structure 408 to a dataspace manager. In the disclosed example, the UI is implemented based on a mouse and keyboard input with a visual display output. In other examples, other UI implementations (e.g., touch screens, voice command systems and microphones) may be used. Cursor 410 is disclosed herein to indicate potential actions by the dataspace manager. Features associated with each of ETL ML model data structures 402-406 and output schema data structure 408 are displayed under the data structure name. For instance, referring to ETL ML model data structure 404, the data structure name of "warehouse" is displayed with the features "volume_id," "capacity_free," "capacity_total," and more displayed beneath the data structure name. The data structures and features disclosed are not representative of a usual count of data structures and features displayed to the dataspace manager. Any number of ETL ML model and output schema data structures and features may be displayed. In some examples, some of the data structures and features may be omitted from the display.

Figure 5:
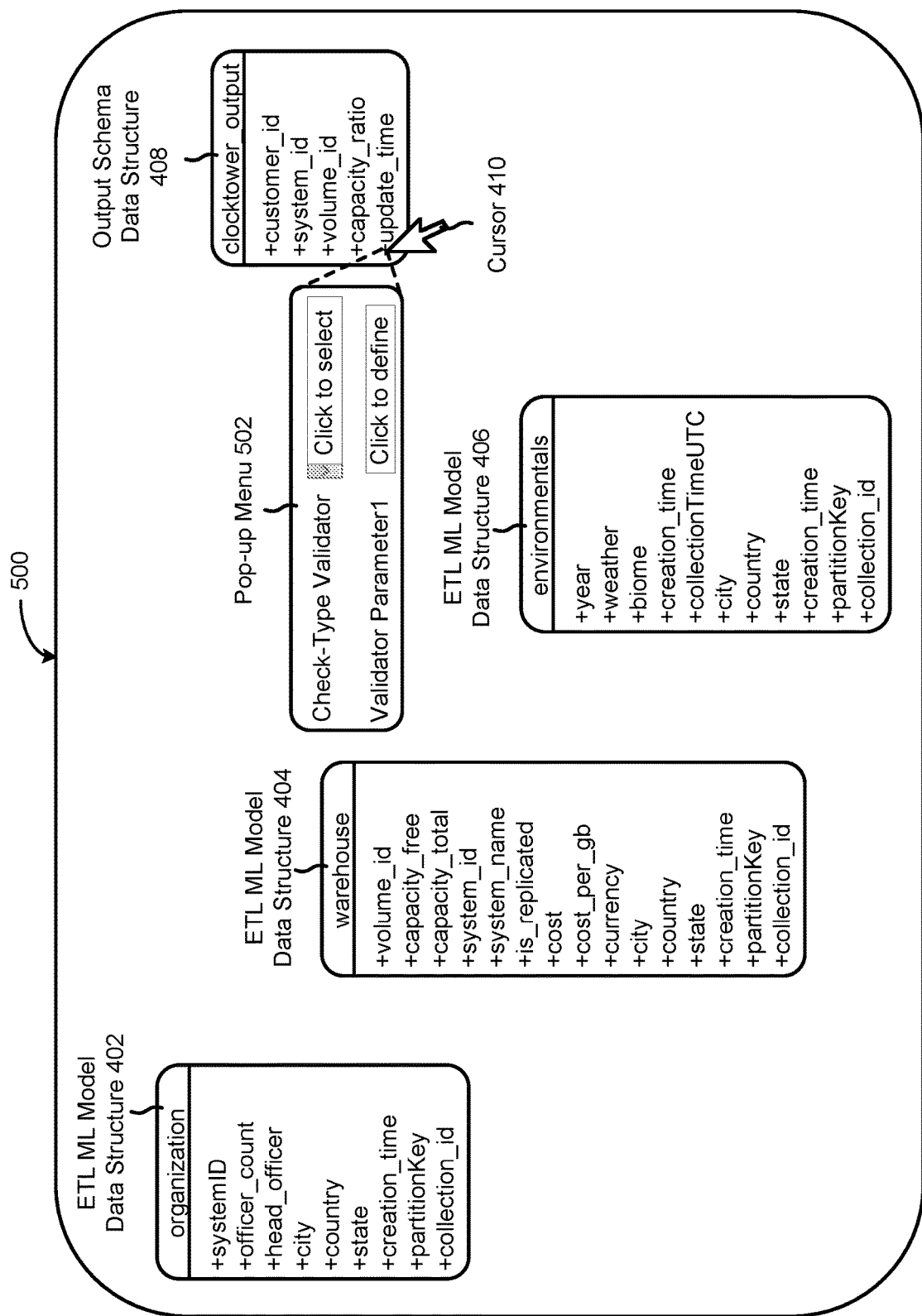
FIG. 5 illustrates an example second UI interaction of a validator rule generation process, in accordance with examples disclosed herein.

FIG. 5 illustrates an example second UI interaction 500 of a validator rule generation process, in accordance with examples disclosed herein. In the second UI interaction 500, the dataspace manager clicks on the "+" symbol preceding the feature "update_time" of output schema data structure 408. Clicking this "+" symbol displays pop-up menu 502, wherein the dataspace manager may select a VDL pre-set check-type validator rule (e.g. dateTypeCheck, listValueCheck, rangeCheck) from a drop-down list. Pop-up menu 502 also provides a textbox where the dataspace manager may type in a parameter for the selected check-type validator rule (e.g., the "specified range of values" for a rangeCheck validator rule).

Figure 6:
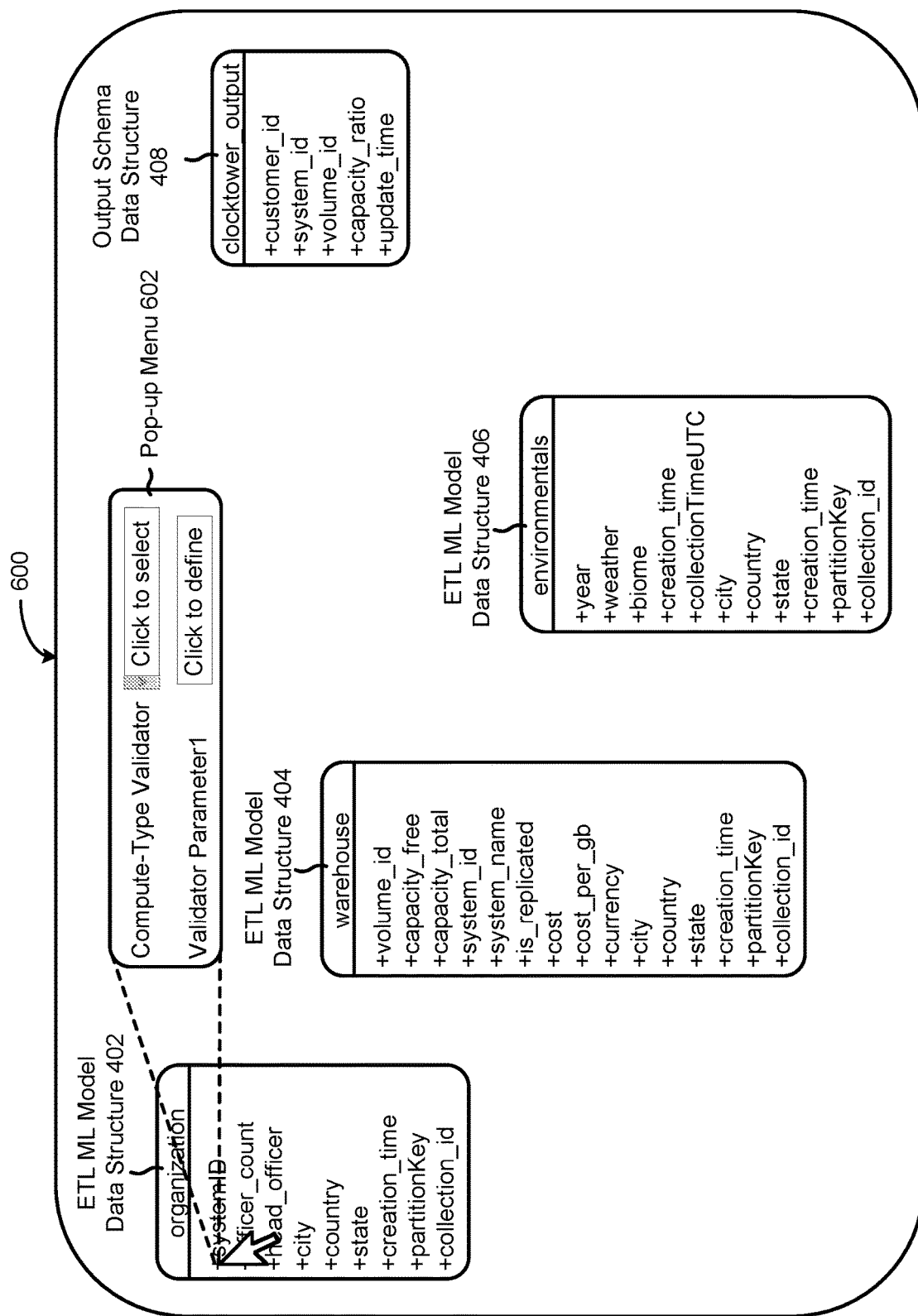
FIG. 6 illustrates an example third UI interaction of a validator rule generation process, in accordance with examples disclosed herein.

FIG. 6 illustrates an example third UI interaction 600 of a validator rule generation process, in accordance with examples disclosed herein. In the third UI interaction 600, the dataspace manager clicks on the "+" symbol preceding the feature "systemID" of ETL ML model data structure 402. Clicking this "+" symbol displays pop-up menu 602, wherein the dataspace manager may select a VDL pre-set compute-type validator rule (e.g. directCompare, directMapping, isNull) from a drop-down list. Pop-up menu 602 also provides a textbox where the dataspace manager may type in a parameter for the selected compute-type validator rule (e.g., the "specified value" for scenarios where the value at the intake data field is null under an isNull validator rule). In some examples, the dataspace manager may click on a "+" symbol preceding an output schema data structure feature while pop-up menu 602 is open. In such examples, the compute-type validator rule may be defined as relating the output schema data structure feature (as a result data field) and the ETL ML model data structure feature (as an intake field) that was clicked to open the 602 pop-up menu.

Figure 7:
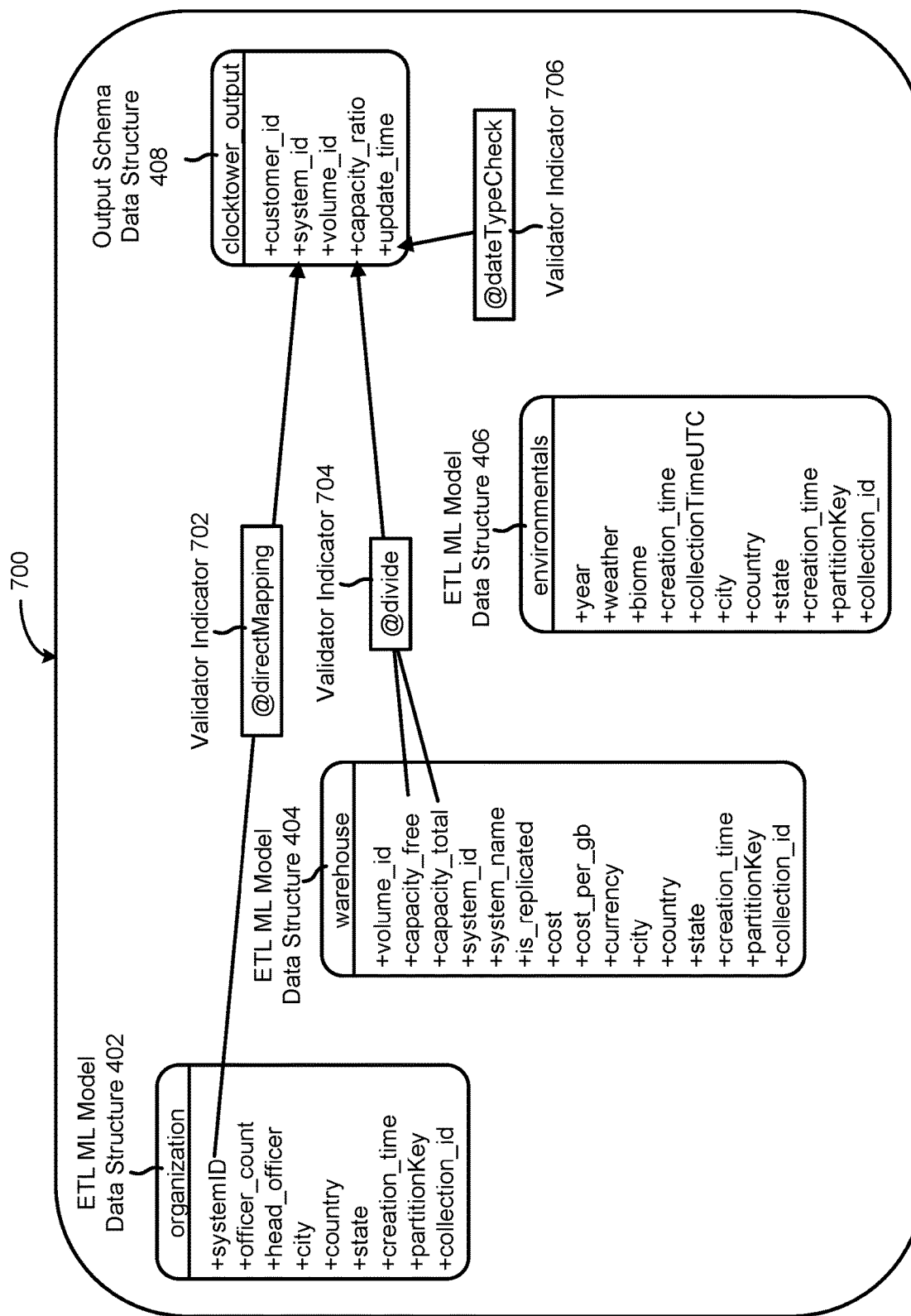
FIG. 7 illustrates an example fourth UI interaction of a validator rule generation process, in accordance with examples disclosed herein.

FIG. 7 illustrates an example fourth UI interaction 700 of a validator rule generation process, in accordance with examples disclosed herein. In the fourth UI interaction 700, the currently defined validator rules are displayed to the dataspace manager. Validator indicator 702 indicates that a "directMapping" compute-type validator rule has been defined relating the ETL ML model data structure 402 feature "systemID" to output schema data structure 408 feature "system_id." Validator indicator 704 indicates that a "divide" compute-type validator rule has been defined relating the ETL ML model data structure 404 features "capacity_free" and "capacity_total" to output schema data structure 408 feature "capacity_ratio." Validator indicator 706 indicates that a "dateTypeCheck" check-type validator rule has been defined regarding the output schema data structure 408 feature "update_time." In some examples, the dataspace manager may click on validator indicators 702-706 to further edit the associated validator rules. For instance, the divide validator indicator 704 may be clicked on to add more ETL ML model data structure features which will be divided into each other to calculate the value at a "capacity_ratio" feature within a "clocktower_output" data structure of an expected output dataset. The disclosed UI interactions 400-700 are only exemplary, any convention for display or user interaction may be utilized to achieve the disclosed indications or actions.

Figure 8:
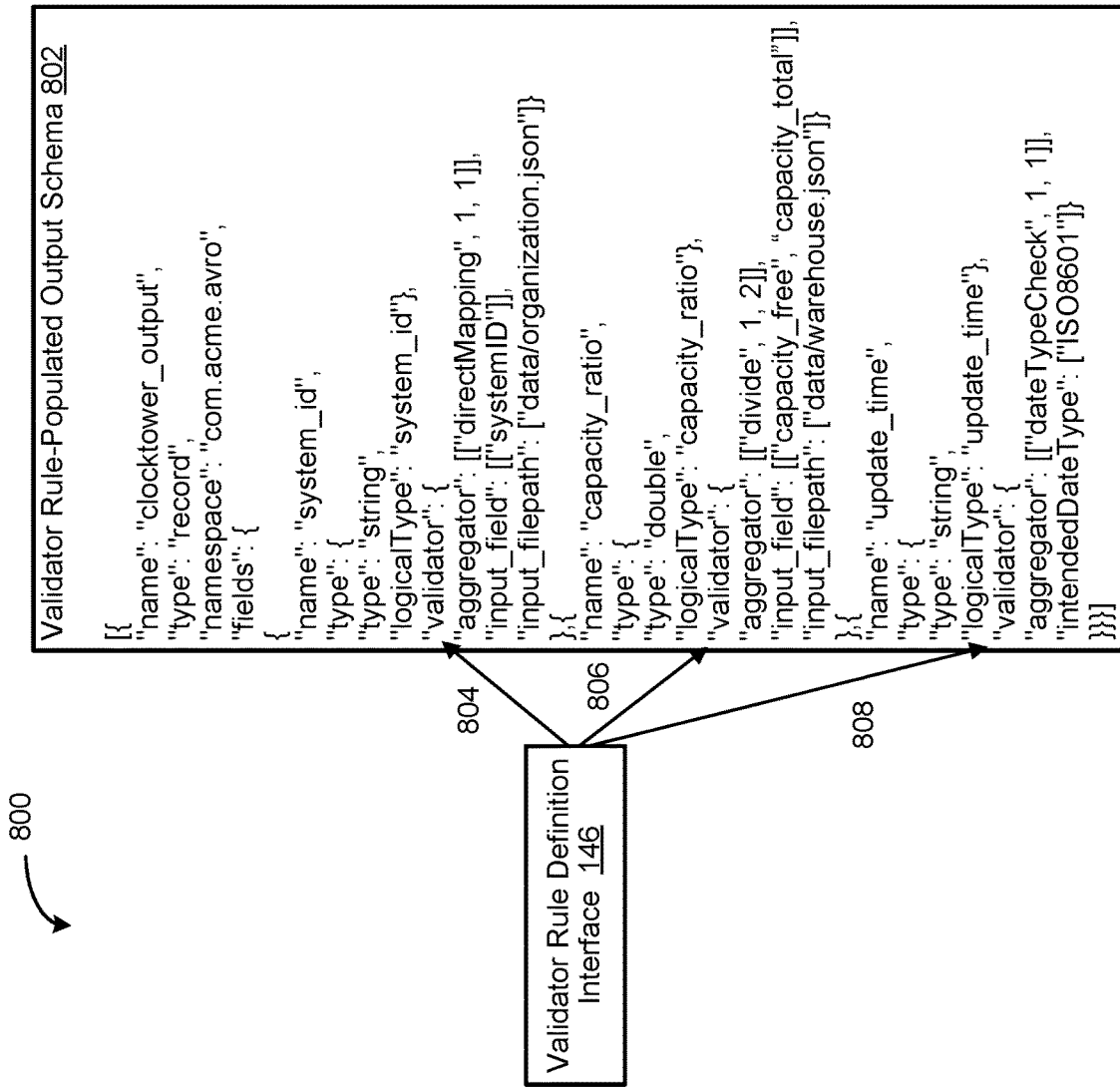
FIG. 8 illustrates an example output phase of a validator rule generation process, in accordance with examples disclosed herein.

FIG. 8 illustrates an example output phase 800 of a validator rule generation process, in accordance with examples disclosed herein. The validator rule definition interface 146 processes the validator rule relations and parameters defined in UI interactions 400-700 and generates validator rules. The validator rule definition interface 146 may insert the validator rules into output schema 212 to generate validator rule-populated output schema 802. Output schema population actions 804-808 may be carried out by validator rule definition interface 146. Output schema population actions 804-808 need not occur in any particular order.

In the illustrated example, output schema population action 804 populates the "system_id" feature within the "clocktower_output" data structure with a compute-type "directMapping" validator rule. The "directMapping" validator rule instructs that the value at the "systemID" feature within data structure "data/organization.json" is copied to the value at the "system_id" feature within the "clocktower_output" data structure. Population action 804 may be understood to correlate with the "directMapping" validator rule indicated by validator indicator 702 of FIG. 7.

Output schema population action 806 populates the "capacity_ratio" feature within the "clocktower_output" data structure with a compute-type "divide" validator rule. The "divide" validator rule instructs that the value at the "capacity_ratio" feature within the "clocktower_output" data structure is calculated based on the value at the "capacity_free" feature within the "data/warehouse.json" data structure divided by the value at the "capacity_total" feature within the "data/warehouse.json" data structure. Population action 806 may be understood to correlate with the "divide" validator rule indicated in validator indicator 704 of FIG. 7.

Output schema population action 808 populates the "update_time" feature within the "clocktower_output" data structure with a check-type "dateTypeCheck" validator rule. The "dateTypeCheck" validator rule instructs that the value at the "update_time" field within data structure "clocktower_output" is formatted according to an "ISO8601" date type format. Population action 808 may be understood to correlate with the "dateTypeCheck" validator rule indicated in validator indicator 706 of FIG. 7.

Note that the validator rules are defined herein with reference to data fields found in the ETL ML model 124 (e.g. "capacity_free" within "data/organization.json") and data fields found in the output schema 212 (e.g. "capacity ratio" within "clocktower_output"). As described above, data fields in the ETL ML model 124 may reappear across multiple test datasets, and data fields in the output schema 212 may reappear across multiple actual output datasets and their associated output schema. This reappearance enables the reuse of validator rules in later iterations of the validation process, as the reappeared fields can still be followed to refer to data items within a test dataset, actual output dataset, and output schema.

Validator rule-populated output schema 802 is illustrated as JSON formatted data, however, in other examples, validator rule-populated output schema 802 and/or the validator rules may be defined using any language compatible with defining relations between data fields and defining characteristics of data items (e.g., XML, Avro, YAML). The validator rules are illustrated herein as being combined with the output schema 212 to form validator rule-populated output schema 802, however in some examples, the validator rules may be kept as a separate data structure (e.g., validator rules 150 as illustrated in FIG. 1).

The validator rules within validator rule-populated output schema 802 may be utilized by the expected output engine 152 to generate an expected output dataset. The validator rules and expected output dataset may be utilized by the validation engine 156 to generate validation metrics for the ETL ML pipeline. The expected output engine 152, and validation engine 156 are described in further detail below in relation to FIGS. 9-10.

Figure 9:
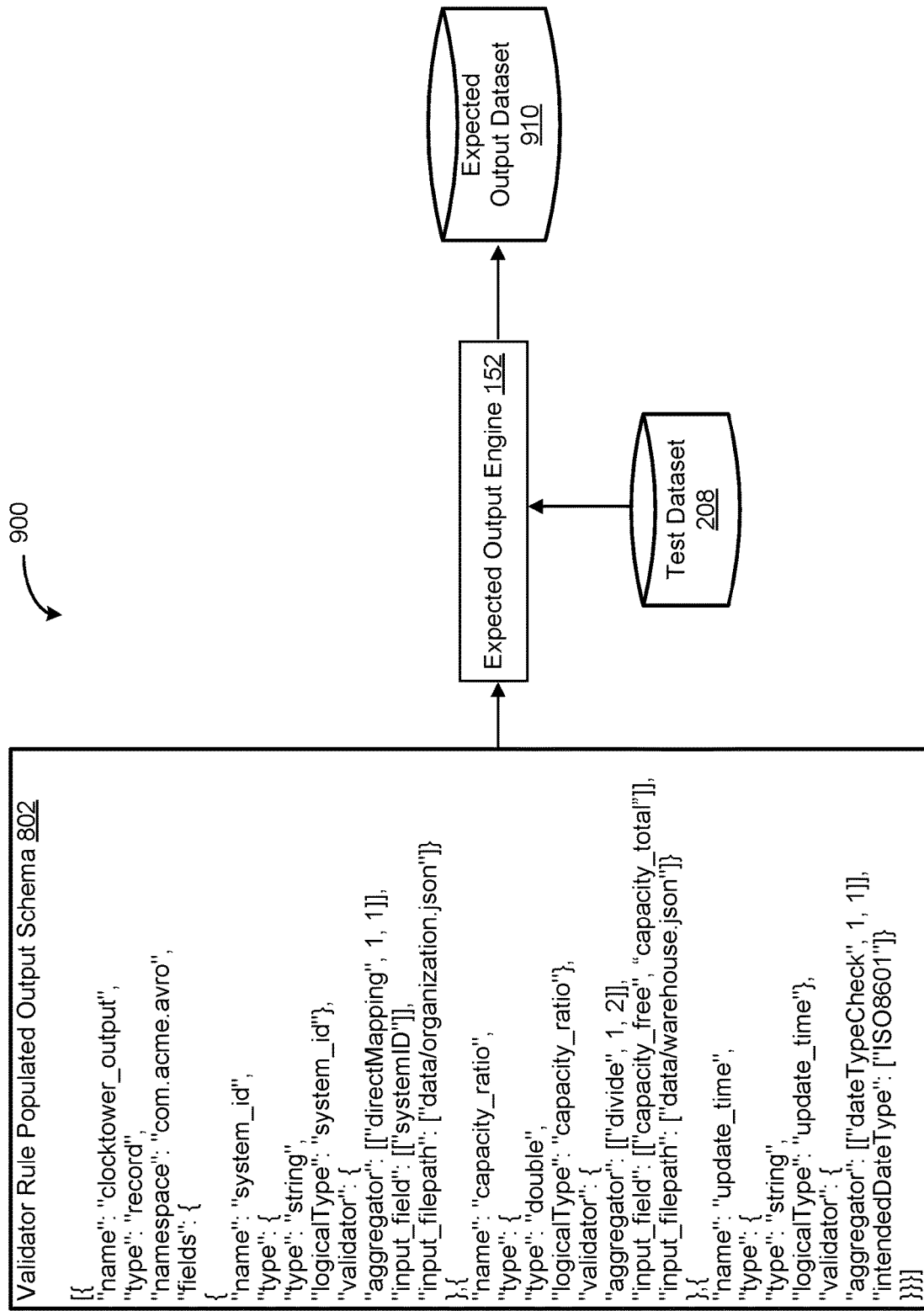
FIG. 9 illustrates example data flows between components of an ETL ML pipeline validation system that may occur during an expected output dataset generation process, in accordance with examples disclosed herein.

FIG. 9 illustrates example data flows between components of an ETL ML pipeline validation system 100 that may occur during an expected output dataset generation process 900, in accordance with examples disclosed herein. The validator rule-populated output schema 802 and test dataset 208 may be fed into expected output engine 152 to generate the expected output dataset 910. The expected output dataset 910 may approximate the dataset expected to be generated when transforming test dataset 208 into an output dataset, wherein the transformation is consistent with the intended transformation of the input dataspace into the output dataspace. Expected output engine 152 may execute instructions within the compute-type validator rules, such as those inserted in the validator rule-populated output schema 802. When executed, instructions within the compute-type validator rules may cause a processor to compute data items within the expected output dataset based on values read from intake data fields reappearing within the test dataset 208. For example, compute-type validator rule "directMapping" includes a reference to the intake data field "systemID" in a data structure "data/organization.json." Expected output engine 152 may then search the test dataset 208 for a reappearance of a data structure field "systemID" in a data structure "data/organization.json" and read the value contained therein. The expected output engine 152 may then complete the direct mapping relation by writing the read value to a "system_id" data field in a data structure "clocktower_output" within the expected output dataset 910.

Once all compute-type validator rules have been executed, the expected output dataset 910 may be built. In some examples, the check-type validator rules may be utilized by the expected output engine 152 to further describe the values written into data fields of expected output dataset 910. For instance, where the "rangeCheck" check-type validator rule was defined regarding the "system_id" data field of the data structure "clocktower_output," the value written into the reappearance of the "system_id" data field within expected output dataset 910 may be limited; Where the value to be written exceeds the upper limit of the specified range, the upper limit of the specified range is instead written to the value. In some examples, further processes may be included to complete generation of an expected output dataset. In some examples, processes disclosed herein may be omitted while still allowing for a complete generation of an expected output dataset.

Figure 10:
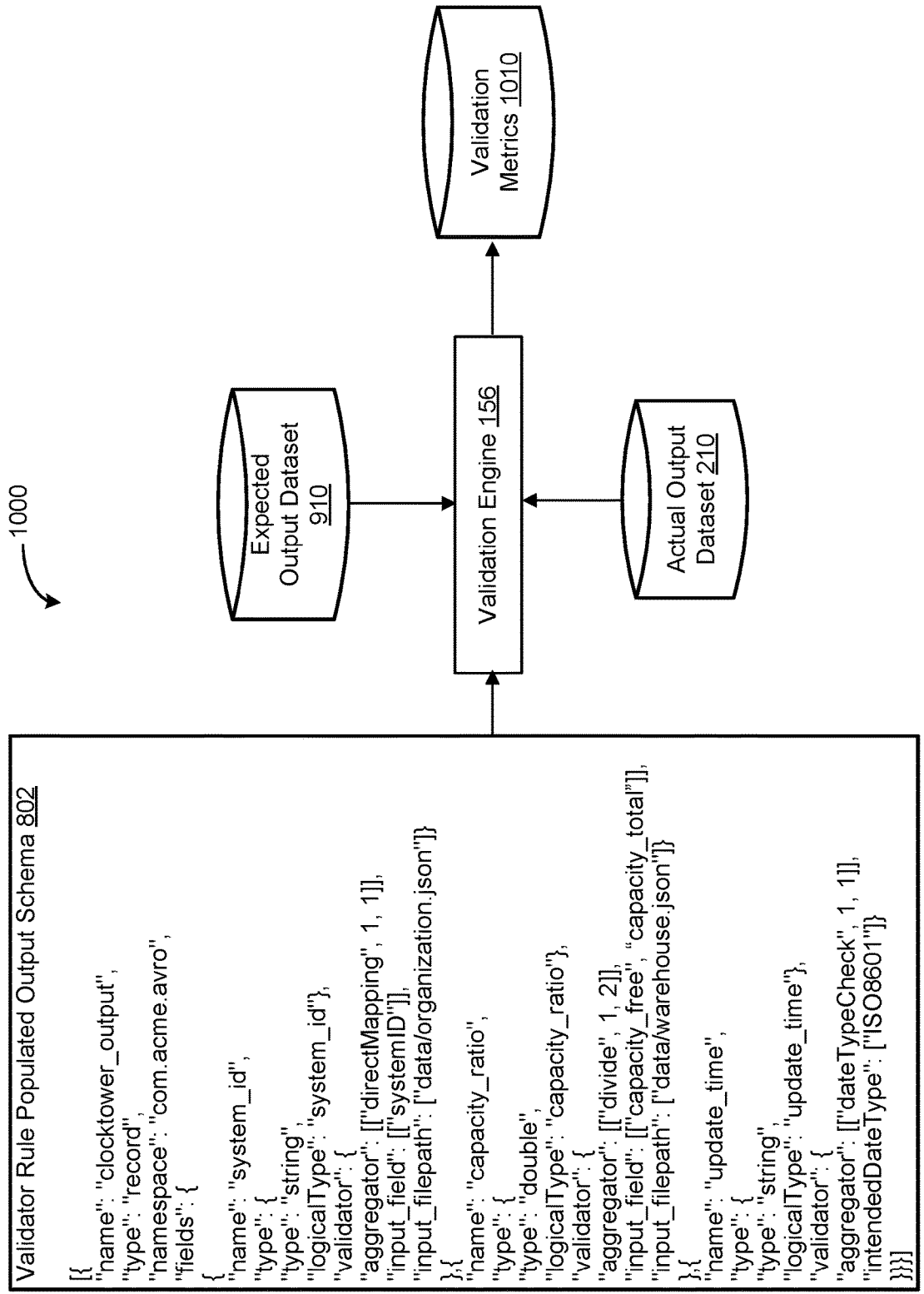
FIG. 10 illustrates example data flows between components of an ETL ML pipeline validation system that may occur during a validation metrics generation process, in accordance with examples disclosed herein.

FIG. 10 illustrates example data flows between components of an ETL ML pipeline validation system 100 that may occur during a validation metrics generation process 1000, in accordance with examples disclosed herein. The expected output dataset 910, actual output dataset 210, and validator rule-populated output schema 802 may be fed into validation engine 156 to generate validation metrics 1010. Validation engine 156 may comprise instructions to compare data items within the actual output dataset 210 with data items within the expected output dataset 910. In some examples, these comparisons may be based on the values stored within the data items. In some examples, these comparisons may be based on the characteristics of the data items (e.g. data structure name, data structure feature name, data structure location, value data type, data structure type). In some examples, the comparison instructions may be based on multiple and/or non-analogous data items (e.g. data structures, data structure features, or values) within both the expected output dataset 910 and actual output dataset 210.

In some examples, validation engine 156 may require an exact match between a data item within the expected output dataset 910 and a data item within the actual output dataset 210 before validation engine 156 generates a positive validity determination. In some examples, validation engine 156 may require a minimal correlation between a data item within the expected output dataset 910 and a data item within the actual output dataset 210 before validation engine 156 generates a positive validity determination. In some examples, validation engine 156 may allow for variance in a data item within the actual output dataset 210 from an item within the expected output dataset 910 before validation engine 156 generates a negative validity determination.

Validation engine 156 may execute instructions within the compute-type validator rules, such as those inserted in the validator rule-populated output schema 802, in order to make validation determinations. These check-type validation determinations may be based on whether data items within the output dataset satisfy the check-type validation rule's parameters. For instance, the check-type validator rule "dateTypeCheck" has been populated for the "update_time" data field of "clocktower_output" data structure, wherein the "intendedDateType" parameter has been set to "ISO8601." Validation engine 156 may then search the actual output dataset 210 for an "update_time" data field of a "clocktower_output" data structure. If the value of the "update_time" data field within the actual output dataset 210 is of the type "ISO8601," then the validation engine 156 grants a positive validity determination.

The validation determinations found by validation engine 156 may be further processed and compiled (e.g. averaged together) into a single validation metric 1010 for ETL ML pipeline 126 as applied to test dataset 208. In some examples, validation engine 156 may store the validity determinations as separate validation metrics for ETL ML pipeline 126 as applied to each data item of the actual output dataset 210.

After the validation metrics 1010 have been generated, they may be added to a running store of validation metrics 158, such that transformation of the input dataspace via the ETL ML pipeline 126 may be halted where the ETL ML pipeline 126 has exhibited insufficient validity across multiple test datasets or data items.

Figure 11:
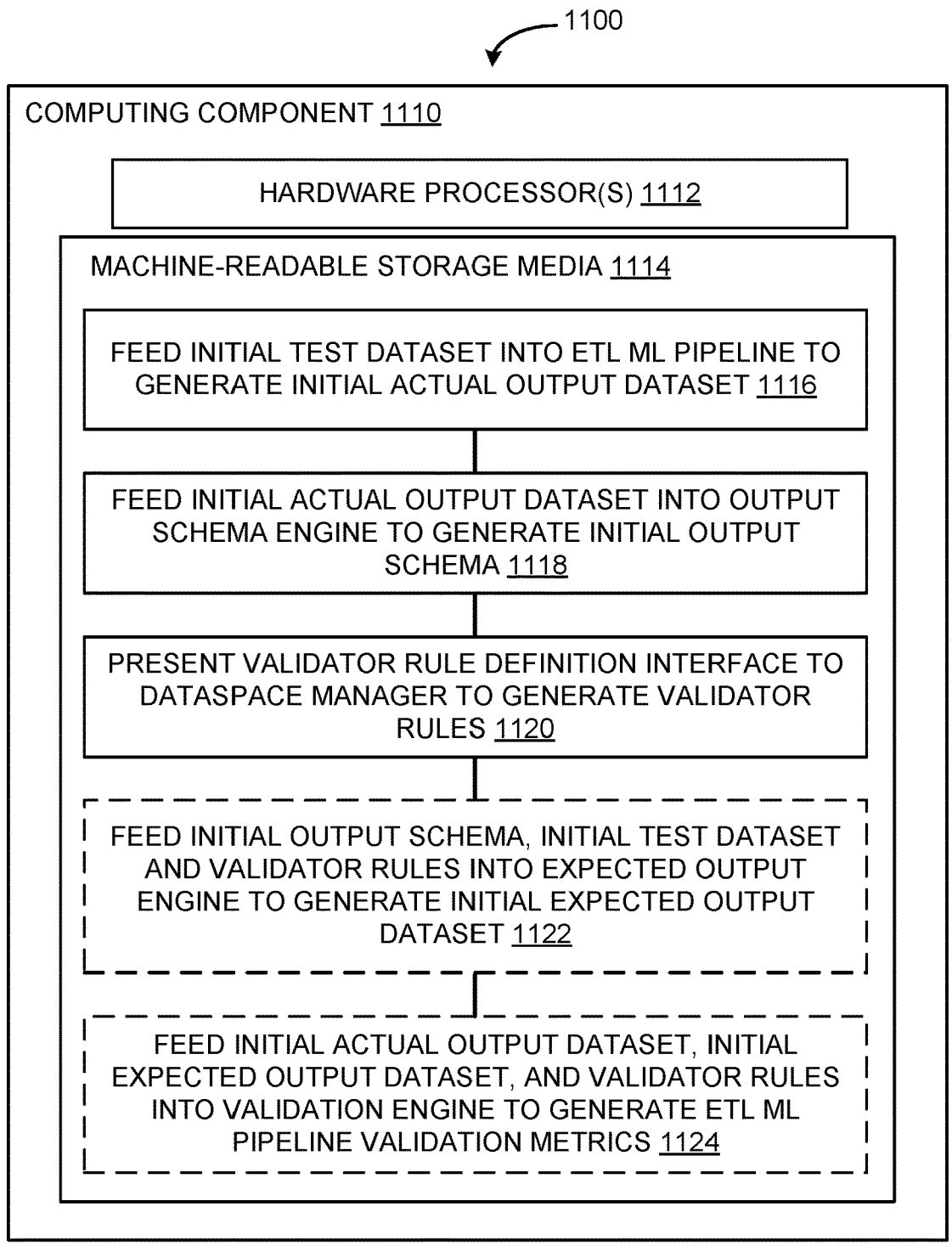
FIG. 11 illustrates an example computing component that may be carry out an example initial validation iteration of an ETL ML pipeline, in accordance with examples disclosed herein.

FIG. 11 illustrates an example computing component 1110 that may be carry out an example initial validation iteration 1100 of an ETL ML pipeline, in accordance with examples disclosed herein. Computing component 1110 may be, for example, an ETL ML pipeline device 110, a remote device 130, a server computer, a controller, or any other similar computing component capable of processing data. In the example implementation of FIG. 11, the computing component 1110 includes a hardware processor(s) 1112, and machine-readable storage medium 1114.

Hardware processor 1112 may be one or more central processing units (CPUs), semiconductor-based microprocessors, and/or other hardware devices suitable for retrieval and execution of instructions stored in machine-readable storage medium 1114. Hardware processor 1112 may fetch, decode, and execute instructions, such as instructions defining operations 1116-1124, to control processes or operations for burst preloading for available bandwidth estimation. As an alternative or in addition to retrieving and executing instructions, hardware processor(s) 1112 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1114, may be any electronic, magnetic, optical, or other physical storage device that contains or stores executable instructions. Thus, machine-readable storage medium 1114 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 1114 may be a non-transitory storage medium, where the term "non-transitory" does not encompass transitory propagating signals. As described in detail below, machine-readable storage medium 1114 may be encoded with executable instructions, for example, instructions defining operations 1116-1124.

Operations 1116-1124 outline an initial validation iteration 1100 of an ETL ML pipeline. The ETL ML pipeline, as discussed above, may implement an ETL ML model, wherein the ETL ML model was generated by training an ETL ML algorithm on a training dataset. Initial validation iteration 1100 is understood to take place after the ETL ML model has been trained and the ETL ML pipeline may be used to transform test datasets into output datasets. Operations 1116-1124 are disclosed in one order herein, but this order should not be understood to be limiting. Initial validation iteration 1100 may be accomplished by operations 1116-1126 executed in a different order, and/or with some of operations 1116-1126 omitted, and/or with undisclosed operations added in. Where an operation is depicted with a hashed box, the depicted operation may be omitted from initial validation iteration 1100.

At operation 1116, an initial test dataset is fed into an ETL ML pipeline to generate an initial actual output dataset. If the ETL ML pipeline is valid, the generated initial actual output datasets may relate to the initial test dataset in some way following the intended transformation of the input dataspace to the output dataspace.

At operation 1118, the initial actual output dataset is fed into the output schema engine to generate an initial output schema. The initial output schema comprises data fields that may reappear across multiple output schema. The output schema engine is described in more detail above with relation to FIG. 2.

At operation 1120, the initial output schema and initial test dataset are presented by the validator rule definition interface to a dataspace manager via a UI. The dataspace manager may be, but need not be, the same dataspace manager who built the training dataset. The validator rule definition interface allows the dataspace manager to describe validator rules with reference to data fields within the ETL ML model and/or initial output schema. In some examples, these UI may provide VDL pre-sets from a VDL library in order to guide the description of the validator rules. The validator rule definition interface takes the dataspace manager's description of the validator rules and generates the validator rules. Operation 1120 may be understood to correlate with the user-interaction based validator rule generation process described above in relation to FIGS. 3-8. The validator rule definition interface, validator rule definition process, UI, and VDL library are described in more detail above with relation to FIGS. 3-8.

At operation 1122, the initial output schema, initial test dataset, and validator rules are fed into the expected output engine to generate an initial expected output dataset. In some examples, the expected output engine builds the initial expected output dataset by executing instructions within the validator rules with reference to data fields in the initial test dataset and/or data fields in the initial output schema. The expected output engine is described in more detail above with relation to FIG. 9.

At operation 1124, the initial actual output dataset, initial expected output dataset, and validator rules are fed into the validation engine to generate ETL ML pipeline validation metrics. In some examples, the validation engine compares fields within the initial expected output dataset with analogous fields within the initial output dataset and assigns a validity determination to the ETL ML pipeline according to the comparison. The validity determination may be added to a running store of validation metrics, such that transformation of the input dataspace via the ETL ML pipeline may be halted where the ETL ML pipeline has exhibited insufficient validity. The validation engine is described in more detail above with relation to FIG. 10.

After the completion of operation 1124, initial validation iteration 1100 has been completed and a validation determination has been generated for the ETL ML pipeline as it relates to the initial test dataset. Further iterations may be completed after transforming more test datasets of the input dataspace into actual output datasets. The multiple actual output datasets may eventually comprise the complete output dataspace.

Figure 12:
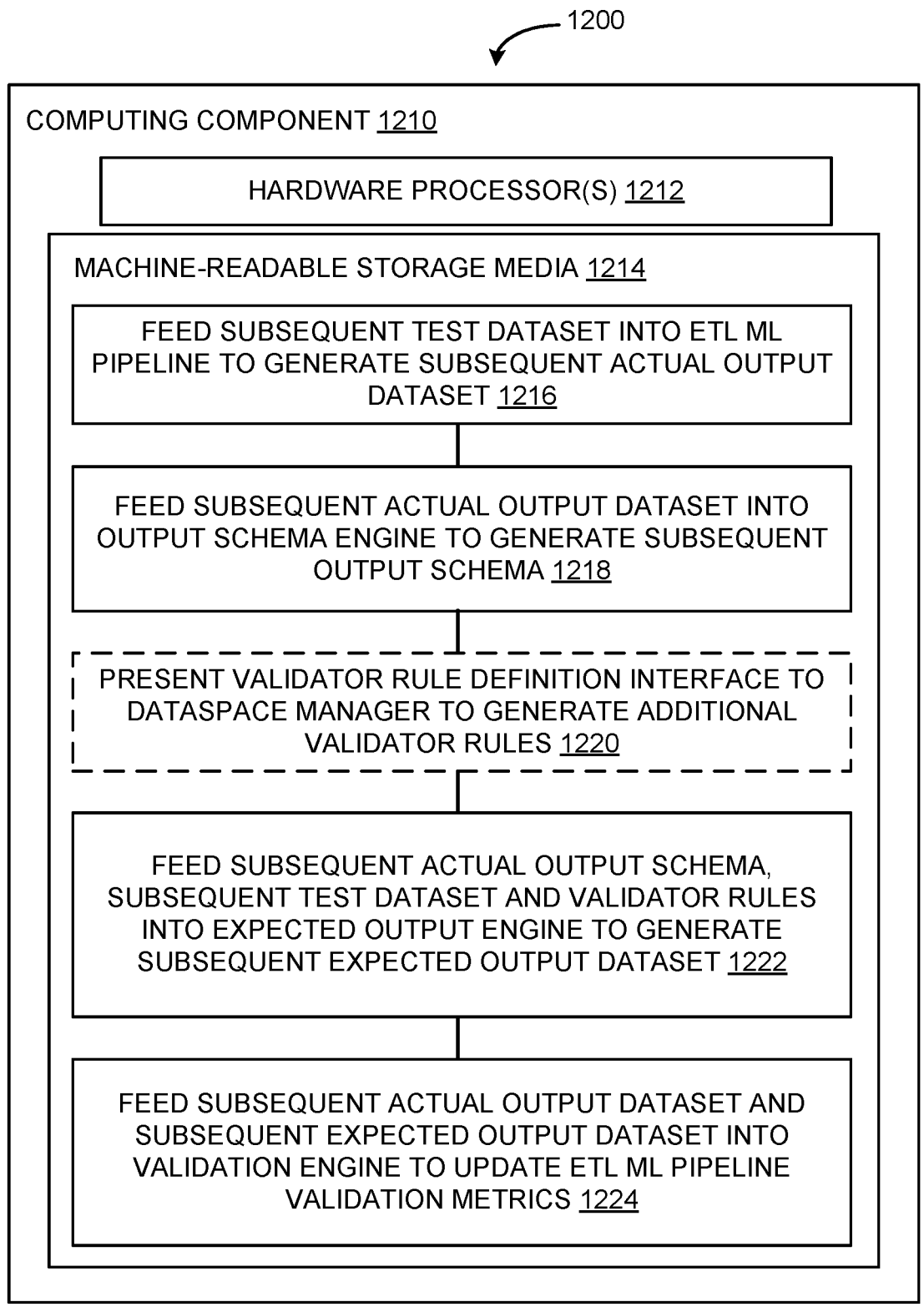
FIG. 12 illustrates an example computing component that may carry out an example subsequent validation iteration of an ETL ML pipeline, in accordance with examples disclosed herein.

FIG. 12 illustrates an example computing component that may carry out an example subsequent validation iteration 1200 of an ETL ML pipeline, in accordance with examples disclosed herein. Computing component 1210 may be, for example, an ETL ML pipeline device 110, a remote device 130, a server computer, a controller, or any other similar computing component capable of processing data. In the example implementation of FIG. 12, the computing component 1210 includes a hardware processor(s) 1212, and machine-readable storage medium 1214.

Hardware processor 1212 may be one or more central processing units (CPUs), semiconductor-based microprocessors, and/or other hardware devices suitable for retrieval and execution of instructions stored in machine-readable storage medium 1214. Hardware processor 1212 may fetch, decode, and execute instructions, such as instructions defining operations 1216-1224, to control processes or operations for burst preloading for available bandwidth estimation. As an alternative or in addition to retrieving and executing instructions, hardware processor(s) 1212 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1214, may be any electronic, magnetic, optical, or other physical storage device that contains or stores executable instructions. Thus, machine-readable storage medium 1214 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 1214 may be a non-transitory storage medium, where the term "non-transitory" does not encompass transitory propagating signals. As described in detail below, machine-readable storage medium 1214 may be encoded with executable instructions, for example, instructions defining operations 1216-1224.

Operations 1216-1224 outline a subsequent validation iteration 1200 of an ETL ML pipeline. The ETL ML pipeline, as discussed above, may implement an ETL ML model, wherein the ETL ML model was generated by training an ETL ML algorithm on a training dataset. Subsequent validation iteration 1200 is understood to take place after an initial validation iteration 1100 has been executed. An example initial validation iteration 1100 is described in relation to FIG. 11 above. Operations 1216-1224 are disclosed in one order herein, but this order should not be understood to be limiting. Subsequent validation iteration 1200 may be accomplished by operations 1216-1226 executed in a different order, and/or with some of operations 1216-1226 omitted, and/or with undisclosed operations added in. Where an operation is depicted with a hashed box, the depicted operation may be omitted from subsequent validation iteration 1200.

At operation 1216, a subsequent test dataset is fed into an ETL ML pipeline to generate a subsequent actual output dataset. If the ETL ML pipeline is valid, the generated subsequent actual output datasets may relate to the subsequent test dataset in some way following the intended transformation of the input dataspace into the output dataspace.

At operation 1218, the subsequent actual output dataset are fed into the output schema engine to generate a subsequent output schema. The subsequent output schema comprises data fields that may reappear across multiple output schema. The output schema engine is described in more detail above with relation to FIG. 2.

At operation 1220, the subsequent output schema and subsequent test dataset are presented by the validator rule definition interface to a dataspace manager via a UI. The dataspace manager may be, but need not be, the same dataspace manager who built the training dataset. The validator rule definition interface allows the dataspace manager to describe validator rules with reference to data fields within the ETL ML model and/or subsequent output schema. In some examples, these UI may provide VDL pre-sets from a VDL library in order to guide the description of the validator rules. The validator rule definition interface takes the dataspace manager's description of the validator rules and generates additional validator rules. The additional validator rules generated in operation 1220 may be added to previously generated validator rules (e.g., validator rules generated at a previously executed operation 1120 of initial validation iteration 1100), forming a new expanded set of validator rules. In examples of subsequent validation iteration 1200 where operation 1220 is omitted, the previously generated validator rules are used in remaining operations 1222-1224. The validator rule definition interface takes the dataspace manager's description of the validator rules and generates the validator rules. Operation 1220 may be understood to correlate with the user-interaction based validator rule generation process described above in relation to FIGS. 3-8. The validator rule definition interface, validator rule definition process, UI, and VDL library are described in more detail above with relation to FIGS. 3-8.

At operation 1222, the subsequent output schema, subsequent test dataset, and validator rules are fed into the expected output engine to generate a subsequent expected output dataset. In some examples, the expected output engine builds the subsequent expected output dataset by executing instructions within the validator rules with reference to data fields in the subsequent test dataset and/or data fields in the subsequent output schema. The expected output engine is described in more detail above with relation to FIG. 9.

At operation 1224, the subsequent actual output dataset, subsequent expected output dataset, and validator rules are fed into the validation engine to generate ETL ML pipeline validation metrics. In some examples, validation engine compares fields within the subsequent expected output dataset with analogous fields within the subsequent output dataset and assigns a validity determination to the ETL ML pipeline according to the comparison. The validity determination may be added to a running store of validation metrics, such that transformation of the input dataspace via the ETL ML pipeline may be halted where the ETL ML pipeline has exhibited insufficient validity. The validation engine is described in more detail above with relation to FIG. 10.

After the completion of operation 1224, subsequent validation iteration 1200 has been completed and a validation determination has been generated for the ETL ML pipeline as it relates to the subsequent test dataset. Further subsequent validation iterations may be completed to continue generating actual output datasets. These multiple actual output datasets may eventually comprise the complete output dataspace.

Subsequent validation iteration 1200 differs from initial validation iteration 1100 in that operation 1220, containing a user-interaction based validator rule generation process, may be omitted from subsequent validation iteration 1200. This is because the validation rules generated in operation 1120 (also containing a user-interaction based validator rule generation process) of the initial validation iteration 1100 may, in some circumstances, be reused in subsequent validation iterations. Initial iteration validator rules may be reused, for instance, where referenced data fields from the ETL ML model reappear in a subsequent test dataset, and/or where referenced data fields from the initial output schema reappear in a subsequent output schema.

In some examples, the operation 1220 may be executed during multiple subsequent validation iterations, with the generated additional validator rules added to the previously generated validator rules. In some examples, the subsequent validation iteration 1200 may execute operation 1220 if a defined number of previous validation iterations omitted execution of a validator rule generation process. In some examples, subsequent validation iterations may execute a validator rule generation process until the ETL ML pipeline has been validated against a defined number of test datasets. In some examples, validator rules may be accumulated across multiple validation iterations, and a subsequent validation iteration 1200 may execute operation 1220 unless a defined number of validator rules have been accumulated. In some examples, there may be a threshold requirement relating to the set of validity determinations in the running store of validation metrics. Such a threshold requirement may need to be met before ceasing to execute a validator rule generation process on subsequent validation iterations. In some examples, operation 1220 may be executed for any subsequent validation iteration wherein the subsequent test dataset has been flagged for additional validator rule generation.

As discussed above, the ability to exclude user interaction from some validation iterations reduces the requirements for user interaction to validate an ETL ML pipeline as to an entire input dataspace. Automated validation iterations (i.e. validation iterations excluding operation 1220 and its required user-interactions) may still ensure the validation of the ETL ML pipeline as to test datasets by relying on validator rules generated on previous validation iterations. These automated validation iterations facilitate more regular validation of the ETL ML pipeline, which helps to more quickly identify situations where an ETL ML pipeline is invalid. Where an invalid ETL ML pipelines is identified, the expense of further time and energy performing an invalid transformation of the input dataspace via the invalid ETL ML pipeline may be halted.

Figure 13:
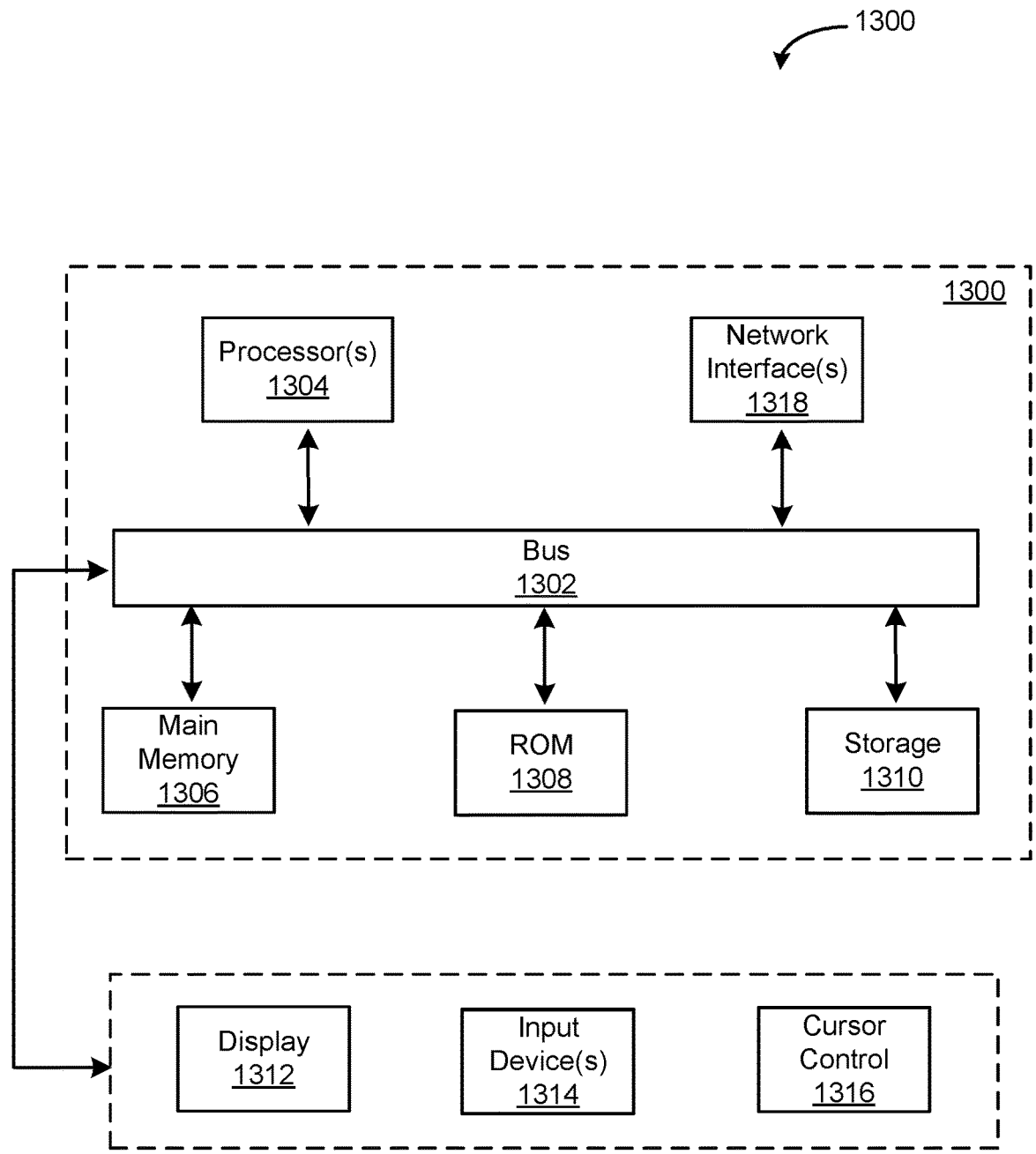
FIG. 13 is an example computing component that may be used to implement various features of embodiments described in the present disclosure.

FIG. 13 depicts a block diagram of an example computer system 1300 in which various of the embodiments described herein may be implemented. The computer system 1300 includes a bus 1302 or other communication mechanism for communicating information, one or more hardware processors 1304 coupled with bus 1302 for processing information. Hardware processor(s) 1304 may be, for example, one or more general purpose microprocessors.

The computer system 1300 also includes a main memory 1306, such as a random access memory (RAM), cache and/or other dynamic storage devices, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

The computer system 1300 further includes a read only memory (ROM) 1308 or other static storage device coupled to bus 1302 for storing static information and instructions for processor 1304. A storage device 1310, such as a magnetic disk, optical disk, or USB thumb drive (Flash drive), etc., is provided and coupled to bus 1302 for storing information and instructions.

The computer system 1300 may be coupled via bus 1302 to a display 1312, such as a liquid crystal display (LCD) (or touch screen), for displaying information to a computer user.

An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. In some examples, the same direction information and command selections as cursor control may be implemented via receiving touches on a touch screen without a cursor.

The computing system 1300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1300 may implement the techniques described herein using customized hard-wired logic, one or more ASICs or FPGAs, firmware and/or program logic which in combination with the computer system causes or programs computer system 1300 to be a special-purpose machine. According to one example, the techniques herein are performed by computer system 1300 in response to processor(s) 1304 executing one or more sequences of one or more instructions contained in main memory 1306. Such instructions may be read into main memory 1306 from another storage medium, such as storage device 1310. Execution of the sequences of instructions contained in main memory 1306 causes processor(s) 1304 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1310. Volatile media includes dynamic memory, such as main memory 1306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1302. Transmission media can also take the form of acoustic or light waves, such as those generated during radio-wave and infra-red data communications.

The computer system 1300 also includes a communication interface 1318 coupled to bus 1302. Network interface 1318 provides a two-way data communication coupling to one or more network links that are connected to one or more local networks. For example, communication interface 1318 may be an integrated services digital network (ISDN) card, cable modem, satellite modem, or a modem to provide a data communication connection to a corresponding type of telephone line. As another example, network interface 1318 may be a local area network (LAN) card to provide a data communication connection to a compatible LAN (or WAN component to communicated with a WAN). Wireless links may also be implemented. In any such implementation, network interface 1318 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1318, which carry the digital data to and from computer system 1300, are example forms of transmission media.

The computer system 1300 can send messages and receive data, including program code, through the network (s), network link and communication interface 1318. In the Internet example, a server might transmit a requested code for an application program through the Internet, the ISP, the local network and the communication interface 1318.

The received code may be executed by processor 1304 as it is received, and/or stored in storage device 1310, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1300.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   generating a first actual output dataset by feeding a first test dataset into an extract-transform-load ("ETL") machine learning ("ML") pipeline;
   generating a first output schema based on the first actual output dataset;
   displaying, to a user, an interface wherein the user may input a validator rule description;
   generating a validator rule based on the validator rule description;
   generating a second actual output dataset by feeding a second test dataset into the ETL ML pipeline;
   generating a second output schema based on the second actual output dataset;
   generating a second expected output dataset based on the second output schema, the second test dataset, and the validator rule;
   generating a validation metric for the ETL ML pipeline based on the second actual output dataset and the second expected output dataset; and
   determining whether to cease further feeding of test datasets into the ETL ML pipeline based on the validation metric.

2. The method of claim 1, further wherein:
   the validator rule comprises instructions for computing a result data item based on an intake data item;
   the result data item was described with reference to a data field within the first output schema; and
   the intake data item was described with reference to a data field within an ETL ML model implemented in the ETL ML pipeline.

3. The method of claim 2, the method further wherein determining whether to cease further feeding of test datasets into the ETL ML pipeline based on the validation metric comprises ceasing further feeding of test datasets into the ETL ML pipeline if the validation metric falls below a determined validity threshold.

4. The method of claim 2, further wherein generating the second expected output dataset comprises:
   executing the instructions within the validator rule to compute the result data item based on the intake data item, wherein the intake data item was read from the second test dataset; and
   writing the result data item to the second expected output dataset.

5. The method of claim 1, further wherein the first output schema comprises a data field from the first actual output dataset.

6. The method of claim 1, further wherein:
   the first test dataset comprises at least one data item from an input dataspace; and
   the second test dataset comprises at least one data item from the input dataspace.

7. The method of claim 1, further wherein generating the validation metric comprises calculating a validity determination based on a comparison of a data item within the second expected output dataset with a data item within the second actual output dataset.

8. An extract-transform-load ("ETL") machine learning ("ML") pipeline validation system, the system comprising:
   a processor; and
   a machine readable medium operatively connected to the processor, wherein the machine readable medium contains executable instructions which, when executed, cause the processor to:
     generate a first actual output dataset by feeding a first test dataset into an extract-transform-load ("ETL") machine learning ("ML") pipeline;
     generate a first output schema based on the first actual output dataset;
     display, to a user, an interface wherein the user may input a validator rule description;

generate a validator rule based on the validator rule description;
generate a second actual output dataset by feeding a second test dataset into the ETL ML pipeline;
generate a second output schema based on the second actual output dataset;
generate a second expected output dataset based on the second output schema, the second test dataset, and the validator rule;
generate a validation metric for the ETL ML pipeline based on the second actual output dataset and the second expected output dataset; and
determine whether to cease further execution of the instructions based on the validation metric.

9. The ETL ML pipeline validation system of claim 8, further wherein:
the validator rule comprises instructions for checking whether a checked data item has an intended characteristic; and
the checked data item was described with reference to a data field within the first output schema.

10. The ETL ML pipeline validation system of claim 9, further wherein, when the processor generates the second expected output dataset, the processor:
executes the instructions within the validator rule to check whether the checked data item has the intended characteristic;
modifies the checked data item based on whether the checked data item has the intended characteristic; and
writes the checked data item to the second expected output dataset.

11. The ETL ML pipeline validation system of claim 9, further wherein, when the processor generates the validation metric, the processor:
executes the instructions within the validator rule to check whether the checked data item has the intended characteristic; and
calculates a validity determination based on whether the checked data item has the intended characteristic.

12. A non-transitory computer-readable storage medium including instructions that, when executed by a processor, cause the processor to:
generate a first actual output dataset by feeding a first test dataset into an extract-transform-load ("ETL") machine learning ("ML") pipeline;
generate a first output schema based on the first actual output dataset;
display, to a user, an interface wherein the user may input a validator rule description;
generate a validator rule based on the validator rule description;
generate a first expected output dataset based on the first output schema, the first test dataset, and the validator rule;
generate a first validation metric for the ETL ML pipeline based on the first actual output dataset and the first expected output dataset;
generate a second actual output dataset by feeding a second test dataset into the ETL ML pipeline;
generate a second output schema based on the second actual output dataset;
generate a second expected output dataset based on the second output schema, the second test dataset, and the validator rule;
generate a second validation metric for the ETL ML pipeline based on the second actual output dataset and the second expected output dataset; and
determine whether to cease further execution of the instructions based on the first validation metric and second validation metric.

13. The non-transitory computer-readable storage medium of claim 12, further wherein the instructions comprise additional validator rule generation instructions, the additional validator rule generation instructions, when executed by the processor, causing the processor to, before generating the second expected output dataset:
display, to the user, an interface wherein the user may input an additional validator rule description;
generate an additional validator rule based on the additional validator rule description; and
update the validator rule by adding the additional validator rule to the validator rule.

14. The non-transitory computer-readable storage medium of claim 13, further wherein the processor executes the additional validator rule generation instructions if a determined number of expected output schema had been generated since a previous execution of the additional validator rule generation instructions.

15. The non-transitory computer-readable storage medium of claim 13, further wherein the processor executes the additional validator rule generation instructions unless a determined number of validation metrics have been generated.

16. The non-transitory computer-readable storage medium of claim 13, further wherein the processor executes the additional validator rule generation instructions unless a determined number of validator rules have been generated.

17. The non-transitory computer-readable storage medium of claim 13, further wherein the processor executes the additional validator rule generation instructions if the second test dataset was flagged.

18. The non-transitory computer-readable storage medium of claim 12, wherein determining whether to cease further execution of the instructions based on the first validation metric and second validation metric comprises ceasing execution of the instructions if the average of the first validation metric and the second validation metric falls below a determined validity threshold.

19. The non-transitory computer-readable storage medium of claim 12, wherein determining whether to cease further execution of the instructions based on the first validation metric and second validation metric comprises ceasing execution of the instructions if the second validation metric falls below a determined validity threshold.

20. The non-transitory computer-readable storage medium of claim 12, wherein determining whether to cease further execution of the instructions based on the first validation metric and second validation metric comprises ceasing execution of the instructions if the first validation metric falls below a determined validity threshold.

* * * * *